US012693372B2

(12) United States Patent (10) Patent No.: US 12,693,372 B2
Gomez Martinez et al. (45) Date of Patent: Jul. 28, 2026

(54) LOCATION OF TARGET OBJECT USING 2-ANTENNA AOA, WIRELESS RANGING, AND USER EQUIPMENT ORIENTATIONS

(71) Applicant: QUALCOMM Incorporated, San Diego, CA (US)

(72) Inventors: Feliciano Gomez Martinez, Los Gatos, CA (US); Liang Zhao, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 18/468,889

(22) Filed: Sep. 18, 2023

(65) Prior Publication Data

US 2025/0093458 A1 Mar. 20, 2025

(51) Int. Cl.
| | |
|---|---|
| *G01S 5/12* | (2006.01) |
| *G01S 5/02* | (2010.01) |
| *H04W 64/00* | (2009.01) |

(52) U.S. Cl.
CPC .............. *G01S 5/12* (2013.01); *G01S 5/0284* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 10,949,579 | B2 * | 3/2021 | Wodrich | .............. G01C 21/206 |
| 11,475,177 | B2 * | 10/2022 | Wodrich | ................... G01S 5/14 |
| 2014/0022059 | A1 * | 1/2014 | Horst | ................. G06K 7/10009 |
| | | | | 340/10.3 |

(Continued)

FOREIGN PATENT DOCUMENTS

| | | |
|---|---|---|
| CN | 114698094 A | 7/2022 |
| EP | 4216577 A1 | 7/2023 |
| WO | 2022025729 A1 | 2/2022 |

OTHER PUBLICATIONS

Chatzistefanou et al.—Target Localization by Mobile Handheld UHF RFID Reader and IMU. IEEE Journal of Radio Frequency Identification, vol. 6, 2022 (Year: 2022).*

(Continued)

*Primary Examiner* — Adolf Dsouza
(74) *Attorney, Agent, or Firm* — Holland & Hart LLP

(57) ABSTRACT
A method for locating a target object includes: determining a plurality of position-orientation-distance-angle values, each including: a position of a user equipment (UE) relative to a reference position; an orientation of the UE relative to a reference orientation; a distance corresponding to the position of the UE, the distance being between the position of the UE and the target object based on wireless ranging signal(s) between the UE and the target object; and an angle corresponding to the position and orientation of the UE, the angle being an AoA of the wireless ranging signal(s) at a first and second antenna of the UE, where a combination of the position and orientation of the UE in each of the position-orientation-distance-angle values is different; and calculating a position of the target object using the plurality of position-orientation-distance-angle values, where the position of the target object is relative to the reference position.

30 Claims, 26 Drawing Sheets

(56)          References Cited

U.S. PATENT DOCUMENTS

2015/0116144 A1*   4/2015  Serrano Olmedo .. G01S 5/0295
                                           342/351
2016/0139238 A1*   5/2016  Bekkali ................... G01S 13/75
                                           342/463

OTHER PUBLICATIONS

Motroni et al.—A Multi-Antenna SAR based method for UHF RFID Tag Localization via UGV; 2018 IEEE (Year: 2018).*
Chatzistefanou R.A., et al., "Target Localization by Mobile Hand-held UHF RFID Reader and IMU", IEEE Journalof Radio Frequency Identification, vol. 6, Jan. 28, 2022, pp. 426-438, XP011915096, p. 426, left-hand col. lin 7-11 p. 426, right-hand col, lin 27-34 p. 427, left-hand col, lin 33-36 Caption, p. 428, Fig 3 p. 428, right-hand col, lin 21-24 p. 429, left-hand col, last lin-right-hand col, lin 1-12 p. 431, left-hand col, lin 6-13 p. 434, left-hand col, lin 1-29 p. 437, right-hand col, lin 10-19 p. 435, right-hand col, lin 7-15.
International Search Report and Written Opinion—PCT/US2024/043069—ISA/EPO—Nov. 21, 2024.

* cited by examiner

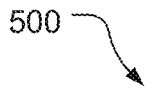

500

```
┌─────────────────────────────────────────────┐
│                                             │┐── 510
│   Receiving a request to locate the target object │
│                                             │
└─────────────────────────────────────────────┘
                      │
                      ▼
┌─────────────────────────────────────────────┐
│ Determining a plurality of position-distance-angle │
│ values, each of the plurality of position-orientation- │
│ distance-angle values comprising: a position of the │
│ UE relative to a reference position; an orientation of │
│     the UE relative to a reference orientation │
│ corresponding to the reference position; a distance │
│     corresponding to the position of the UE, the │
│   distance being between the position of the UE and │┐── 520
│    the target object based on one or more wireless │
│    ranging signals between the UE and the target │
│   object; and an angle corresponding to the position │
│    and the orientation of the UE, the angle being an │
│   angle of arrival of the one or more wireless ranging │
│   signals measured at a first antenna and a second │
│     antenna of the UE, where a combination of the │
│ position and the orientation of the UE in each of the │
│      plurality of position-orientation-distance-angle │
│                  values is different │
└─────────────────────────────────────────────┘
                      │
                      ▼
┌─────────────────────────────────────────────┐
│ Calculating a position for the target object using the │
│    plurality of position-orientation-distance-angle │┐── 530
│     values, the position of the target object being │
│          relative to the reference position │
└─────────────────────────────────────────────┘
```

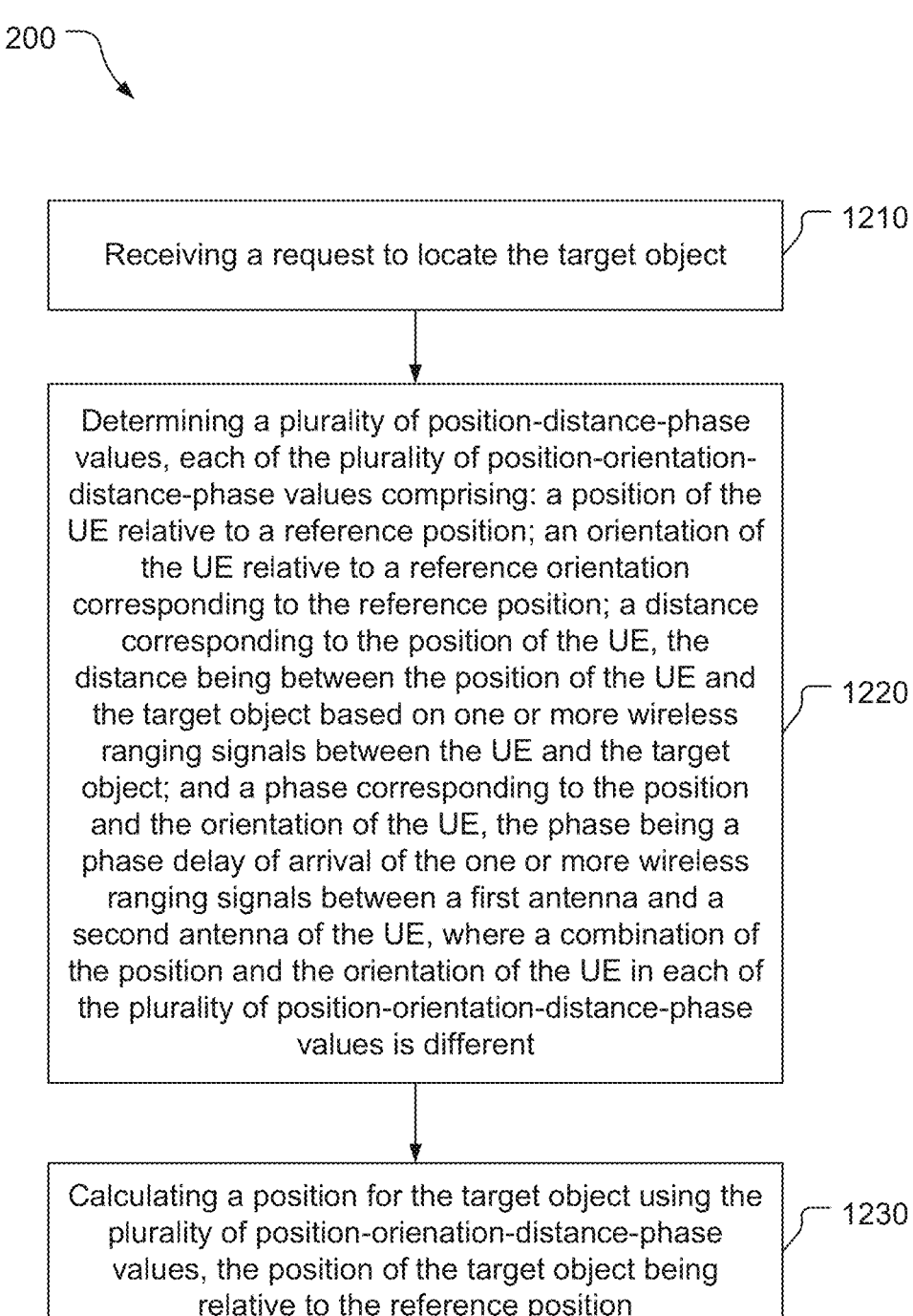

Receiving a request to locate the target object — 1210

Determining a plurality of position-distance-phase values, each of the plurality of position-orientation-distance-phase values comprising: a position of the UE relative to a reference position; an orientation of the UE relative to a reference orientation corresponding to the reference position; a distance corresponding to the position of the UE, the distance being between the position of the UE and the target object based on one or more wireless ranging signals between the UE and the target object; and a phase corresponding to the position and the orientation of the UE, the phase being a phase delay of arrival of the one or more wireless ranging signals between a first antenna and a second antenna of the UE, where a combination of the position and the orientation of the UE in each of the plurality of position-orientation-distance-phase values is different — 1220

Calculating a position for the target object using the plurality of position-orienation-distance-phase values, the position of the target object being relative to the reference position — 1230

FIG. 12

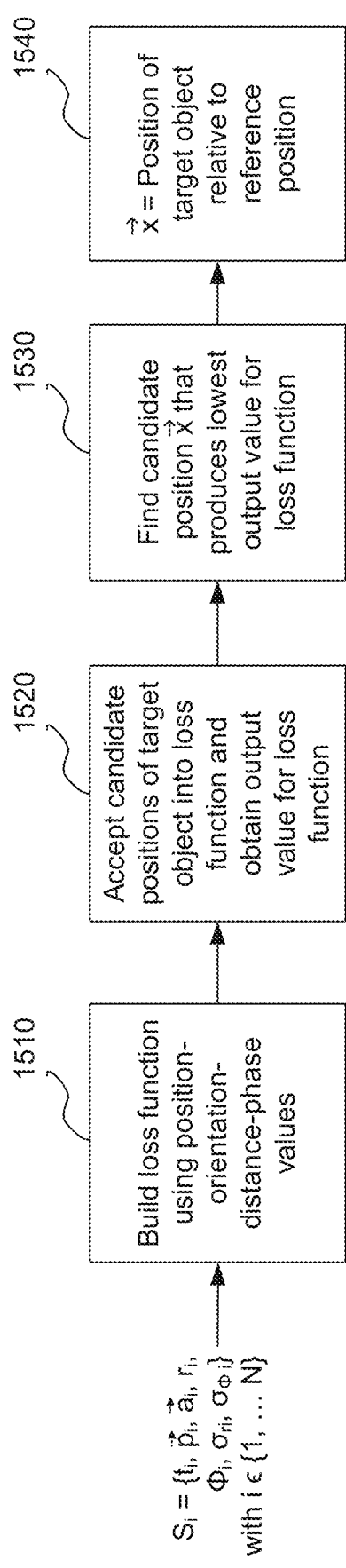

$S_i = \{t_i, \vec{p}_i, \vec{a}_i, r_i, \phi_i, \sigma_{ri}, \sigma_{\phi i}\}$ with $i \in \{1, \ldots N\}$

1510 Build loss function using position-orientation-distance-phase values

1520 Accept candidate positions of target object into loss function and obtain output value for loss function

1530 Find candidate position $\vec{x}$ that produces lowest output value for loss function

1540 $\vec{x}$ = Position of target object relative to reference position

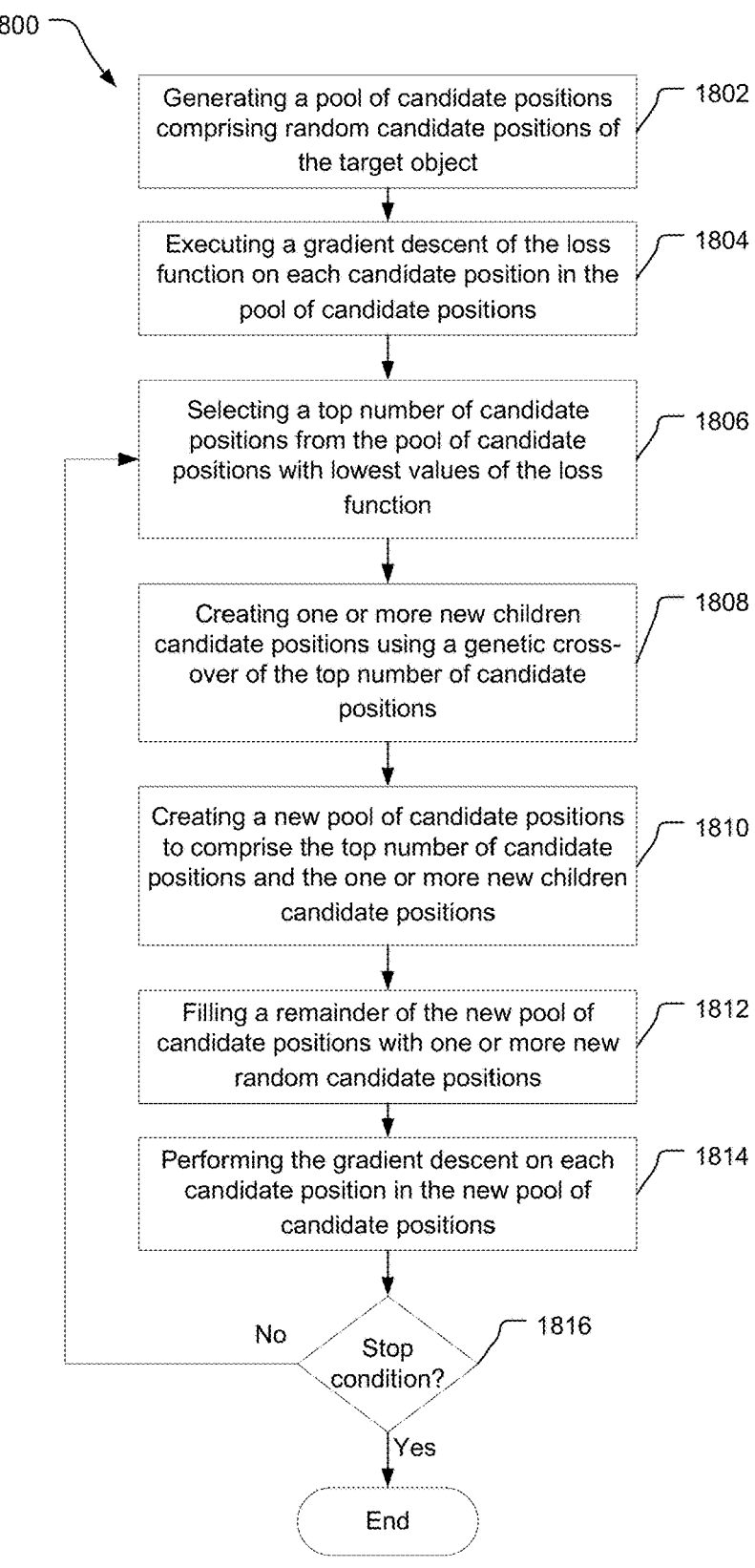

1802 — Generating a pool of candidate positions comprising random candidate positions of the target object 1804 — Executing a gradient descent of the loss function on each candidate position in the pool of candidate positions 1806 — Selecting a top number of candidate positions from the pool of candidate positions with lowest values of the loss function 1808 — Creating one or more new children candidate positions using a genetic cross-over of the top number of candidate positions 1810 — Creating a new pool of candidate positions to comprise the top number of candidate positions and the one or more new children candidate positions 1812 — Filling a remainder of the new pool of candidate positions with one or more new random candidate positions 1814 — Performing the gradient descent on each candidate position in the new pool of candidate positions 1816 — Stop condition?

No

Yes

End

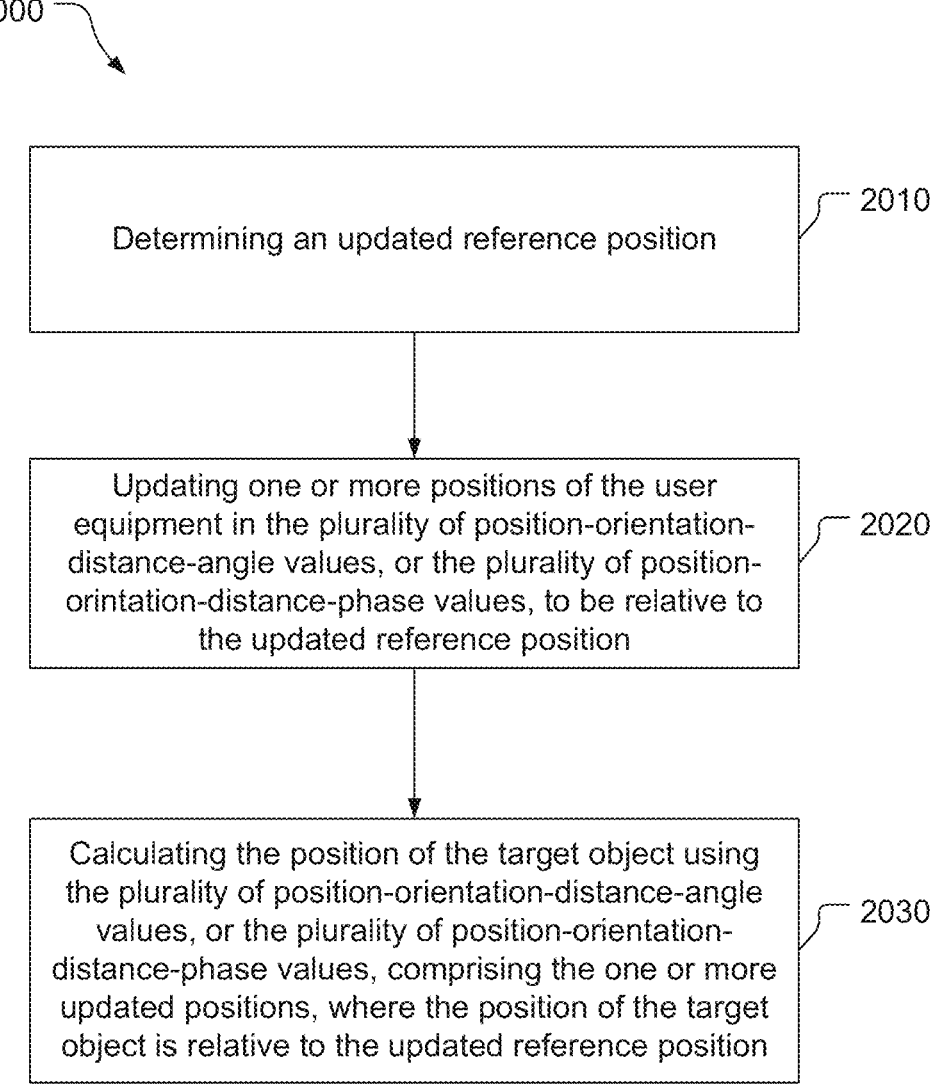

Determining an updated reference position — 2010

Updating one or more positions of the user equipment in the plurality of position-orientation-distance-angle values, or the plurality of position-orintation-distance-phase values, to be relative to the updated reference position — 2020

Calculating the position of the target object using the plurality of position-orientation-distance-angle values, or the plurality of position-orientation-distance-phase values, comprising the one or more updated positions, where the position of the target object is relative to the updated reference position — 2030

LOCATION OF TARGET OBJECT USING 2-ANTENNA AOA, WIRELESS RANGING, AND USER EQUIPMENT ORIENTATIONS

BACKGROUND

Finding a lost object using wireless signals between a user equipment and the lost object often relies on the availability of more than two antennas for the determination of 3D Angle of Arrival (AoA) information. The inclusion of 3D AoA antennas on a device requires additional components, printed circuit board space, and special calibration to support a third or more antennas. Without more than two antennas, 3D AoA information is not available for the finding of the object.

SUMMARY

In an example, a user equipment, includes: a first antenna and a second antenna; one or more memories; and one or more processors communicatively coupled to the one or more memories. The one or more processors being configured to: determine a plurality of position-orientation-distance-angle values, each of the plurality of position-orientation distance-angle values including: a position of the user equipment relative to a reference position; an orientation of the user equipment relative to a reference orientation corresponding to the reference position; a distance corresponding to the position of the user equipment, the distance being between the position of the user equipment and the target object based on one or more wireless ranging signals between the user equipment and the target object; and an angle corresponding to the position and the orientation of the UE, the angle being an angle of arrival of the one or more wireless ranging signals at the first antenna and the second antenna of the user equipment, where a combination of the position and the orientation of the user equipment in each of the plurality of position-orientation-distance-angle values is different; and calculate a position of the target object using the plurality of position-orientation-distance-angle values, where the position of the target object is relative to the reference position.

In another example, a method for locating a target object includes: determining a plurality of position-orientation-distance-angle values, each of the plurality of position-orientation distance-angle values including: a position of a user equipment relative to a reference position; an orientation of the user equipment relative to a reference orientation corresponding to the reference position; a distance between the position of the user equipment and the target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, where a combination of the position and the orientation of the user equipment in each of the plurality of position-orientation-distance-angle values is different; and calculating a position of the target object using the plurality of position-orientation-distance-angle values, where the position of the target object is relative to the reference position.

In another example, a computing device, includes: means for determining a plurality of position-orientation-distance-angle values, each of the plurality of position-orientation distance-angle values including: a position of a user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, where a combination of the position and the orientation of the user equipment in each of the plurality of position-orientation-distance-angle values is different; and means for calculating a position of the target object using the plurality of position-orientation-distance-angle values, where the position of the target object is relative to the reference position.

In another example, a non-transitory, processor-readable storage medium comprising processor-readable instructions to cause one or more processors to: determine a plurality of position-orientation-distance-angle values, each of the plurality of position-orientation distance-angle values including comprising: a position of a user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, where a combination of the position and the orientation of the user equipment in each of the plurality of position-orientation-distance-angle values is different; and calculate a position of the target object using the plurality of position-orientation-distance-angle values, where the position of the target object is relative to the reference position.

BRIEF DESCRIPTION OF THE DRAWINGS

FIG. 5 illustrates a flow diagram of a method for determining a location of a target object by a user equipment with two antennas using 2D AoA.

FIG. 12 illustrates a flow diagram of a method for determining a location of a target object by a user equipment with two antennas using phase delay.

FIG. 15 illustrates an example of a calculation of the position of the target object using phase delay.

FIG. 18 illustrates a flow chart for a method for using a loss function to determine a location of a target object, where a separation L between two antennas of the user equipment is greater than λ/2.

FIG. 20 shows a flow diagram of a method for updating the reference position in the calculation of a position of the target object.

DETAILED DESCRIPTION

Figure 1:
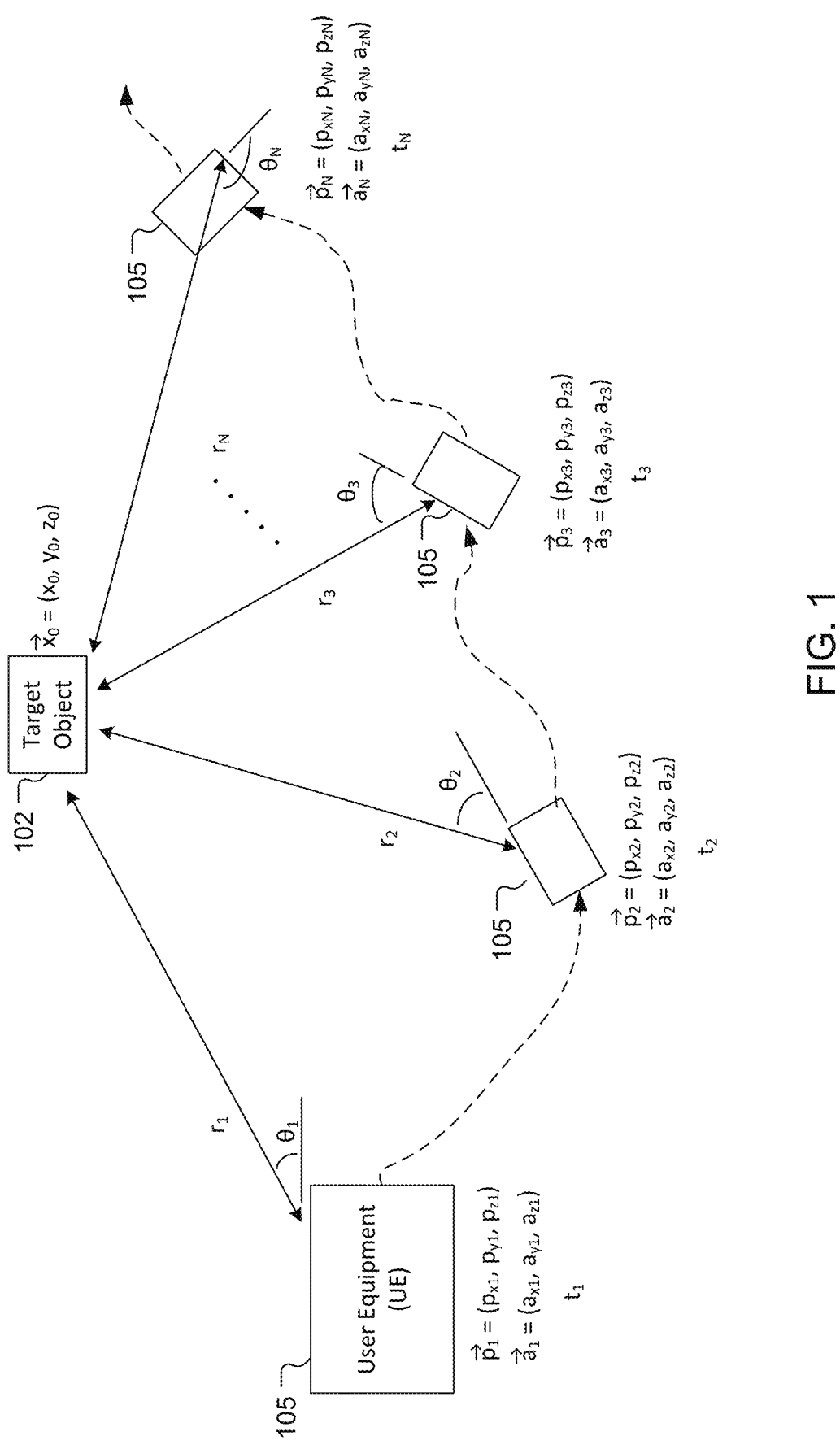
FIG. 1 is a simplified diagram of an example system including a user equipment and a target object to be found.

Techniques are discussed herein for determining a location of a target object using wireless ranging signals and positions of a user equipment (UE) with two antennas. For example, the UE and the target object are each configured to support wireless communication using one or more wireless signals that support wireless ranging techniques. To locate the target object, the location and/or orientation of the UE changes within an environment. At each of various locations of the UE, a position and an orientation of the UE may be calculated, using information from components of the UE, such as sensors. For each calculated position and/or orientation, a distance between the position of the UE and the target object may be measured using one or more wireless ranging signals between the UE and the target object and an angle of arrival (AoA) may be determined. An AoA may be calculated by measuring the phase difference of arrival (PDOA) between the two antennas of the UE. The position of the UE, orientation of the UE, the distance between UE and target object at each calculated location or orientation of the UE, and the AoA form a position-orientation-distance-angle value. Using the combination of the different position-orientation-distance-angle values, the position of the target object may be calculated. Directional information may be displayed to a user based on the position of the target object.

For example, the directional information may direct the user toward a certain direction for a certain distance. Such directional information provides the user with an estimated area within which the target object may be located. As the user continues to change the location and/or orientation of the UE, the position of the target object can be updated, and updated directional information can be provided to the user.

Items and/or techniques described herein may provide one or more of the following capabilities, as well as other capabilities not mentioned. A position of a target object may be calculated using 2D Angle of Arrival (AoA) information determined from two antennas. A UE may be able to locate a target object without requiring a third antenna to determine 3D AoA. Since additional antennas increase the cost of the UE, the functionality of finding lost objects can be provided without incurring the additional costs of a third or more antennas. Locating target objects is possible on UEs that do not have more than two antennas. Other capabilities may be provided and not every implementation according to the disclosure must provide any, let alone all, of the capabilities discussed.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

FIG. 1 is a simplified diagram of an example system including a user equipment and a target object to be found. In general, the user equipment (UE) 105 may be any wireless communication device (e.g., a mobile phone, router, tablet computer, laptop computer, consumer asset tracking device, Internet of Things (IoT) device, etc.). A UE 105 may be mobile or may (e.g., at certain times) be stationary. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. The UE 105 may be embodied by any of a number of types of devices including but not limited to printed circuit (PC) cards, compact flash devices, external or internal modems, wireless or wireline phones, smartphones, tablets, consumer asset tracking devices, asset tags, and so on. The UE 105 may comprise and/or may be referred to as a device, a mobile device, a wireless device, or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, virtual reality headsets, augmented reality glasses, or some other portable or moveable device. The UE 105 supports wireless communication with the target object 102 using one or more Radio Access Technologies (RATs) such as IEEE 802.11 WiFi® (also referred to as Wi-Fi®), Bluetooth® (BT), Ultra-wideband (UWB), etc., that may be used by wireless ranging techniques.

The target object 102 may be another UE. The target object may be any of a variety of devices, e.g., a set of earbuds (or one earbud), earbud chargers, a set of headphones, a smart tag, or any other device capable of wireless communication with the UE 105 using one or more of the RATs that may be used for wireless ranging.

Referring to FIG. 1, to locate the target object 102 according to an example embodiment, the UE 105 changes positions and/or orientations. The UE 105 communicates with the target object 102 using signals of one or more RATs. A position of the UE 105, an orientation of the UE 105, a distance between the position of the UE 105 and the target object 102, and an angle are determined, as described further below. The combination of the position-orientation-distance-angle values at the different positions are used to calculate the position of the target object 102, as described further below.

The position of the UE 105 may be referred to as a position estimate, or position fix, and may be geographic, e.g., location coordinates for the UE 105 in three-dimensional space. A position of the UE 105 may be expressed as an area or volume within which the UE 105 is expected to be located with some probability or confidence level (e.g., 67%, 95%, etc.). A position of the UE 105 may be expressed as a relative position comprising, for example, a distance and direction from a reference position. The relative position may be expressed as relative coordinates (e.g., $\Delta X$, $\Delta Y$, and $\Delta Z$ coordinates) defined relative to the reference position. In the description contained herein, the use of the term "position" may comprise any of these variants unless indicated otherwise.

Figure 2A:
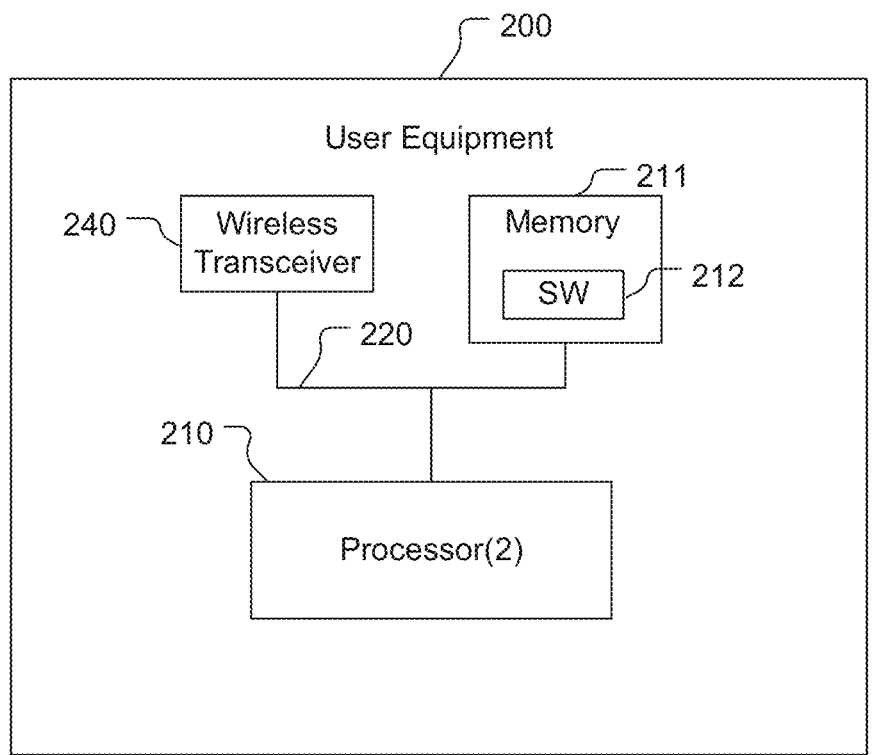
FIG. 2A illustrates an example of a user equipment.

FIG. 2A illustrates an example user equipment 200. The UE 200 may be an example of UE 105. The UE 200 may comprise one or more processors 210, one or more memories 211 including software (SW) 212, and one or more wireless transceivers 240, although any of these devices may be referred to in the singular (e.g., the processor 210) while including one or more of the respective devices. The one or more processors 210 and the one or more memories 211 may be communicatively coupled to each other by a bus 220 (which may be configured, e.g., for optical and/or electrical communication). The transceiver 240 is configured for wireless communication using one or more RATs.

Figure 2B:
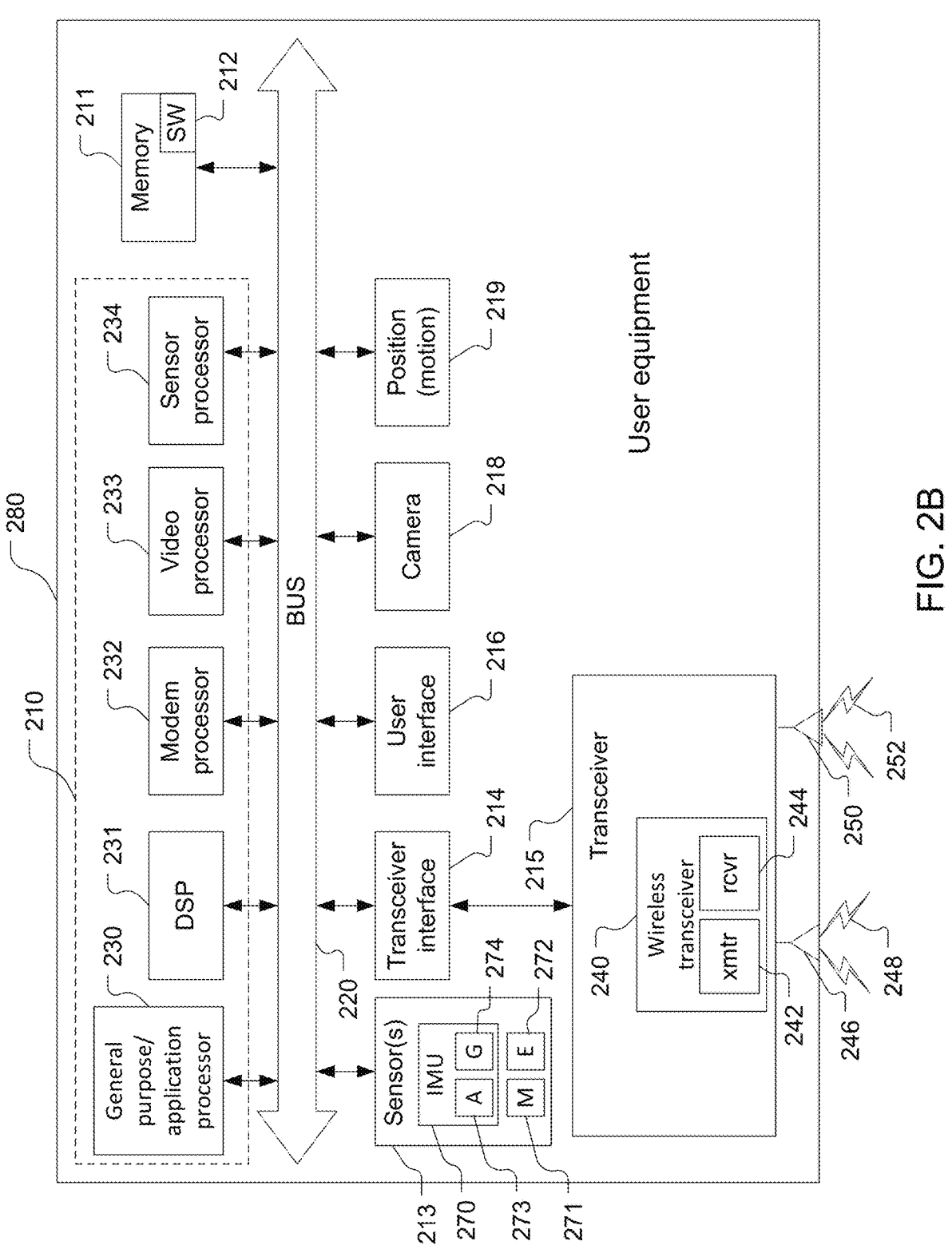
FIG. 2B illustrates a block diagram of components of the example user equipment shown in FIG. 2A.

FIG. 2B illustrates an example user equipment 280. The UE 280 may be an example of the UE 200 shown in FIG. 2A. The UE 280 may comprise a computing platform including one or more processors 210, one or more memories 211 including software (SW) 212, one or more sensors 213, a transceiver interface 214 for the transceiver 215 that includes the wireless transceiver 240, a user interface 216, a camera 218, and a position device (PD) 219. The one or more processors 210, the one or more memories 211, the one or more sensors 213, the transceiver interface 214, the user interface 216, the camera 218, and the position device 219 may be communicatively coupled to each other by a bus 220 (which may be configured, e.g., for optical and/or electrical communication). The one or more processors 210 may include one or more intelligent hardware devices, e.g., a central processing unit (CPU), one or more microcontrollers, an application specific integrated circuit (ASIC), etc. The one or more processors 210 may comprise multiple processors including one or more general-purpose/application processors 230, one or more Digital Signal Processors (DSP) 231, one or more modem processors 232, one or more video processors 233, and/or one or more sensor processors 234. For example, the sensor processor 234 may comprise, e.g., processors for RF (radio frequency) sensing (with one or more wireless signals transmitted and reflection(s) used to identify, map, and/or track an object), and/or ultrasound, etc. The one or more modem processors 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 280 for connectivity. The one or more memories 211 may be one or more non-transitory storage media that may include random access memory (RAM), flash memory, disc memory, and/or read-only memory (ROM), etc. The one or more memories 211 may store the software 212 which may be processor-readable, processor-executable software code containing instructions that may be configured to, when executed, cause the one or more processors 210 to perform various functions described herein. Alternatively, the software 212 may not be directly executable by the one or more processors 210 but may be configured to cause the one or more processors 210, e.g., when compiled and executed, to perform the functions. The description herein may refer to the one or more processors 210 performing a function, but this includes other implementations such as where the one or more processors 210 executes software and/or firmware. The description herein may refer to the one or more processors 210 performing a function as shorthand for one or more of the processors 230-234 performing the function. The description herein may refer to the UE 280 performing a function as shorthand for one or more appropriate components of the UE 280 performing the function. Functionality of the one or more processors 210 is discussed more fully below.

The configuration of the UE 280 shown in FIG. 2B is an example and not limiting of the disclosure, including the claims, and other configurations may be used. For example, an example configuration of the UE 280 includes one or more of the processors 230-234 of the processor 210, the memory 211, a wireless transceiver, and one or more of the sensor(s) 213, the user interface 216, the camera 218, and/or the PD 219.

The UE 280 may comprise the modem processor 232 that may be capable of performing baseband processing of signals received and down-converted by the transceiver 215. The modem processor 232 may perform baseband processing of signals to be upconverted for transmission by the transceiver 215. Also, or alternatively, baseband processing may be performed by the general-purpose/application processor 230 and/or the DSP 231. Other configurations, however, may be used to perform baseband processing.

The UE 280 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 280 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 280 is fixed (stationary) or mobile. For example, for relative positioning information, the sensors/IMU may be used to determine the angle and/or orientation of the other device with respect to the UE 280, etc.

The IMU 270 may be configured to provide measurements about a direction of motion and/or a speed of motion of the UE 280, which may be used in relative location determination. For example, the one or more accelerometers 273 and/or the one or more gyroscopes 274 of the IMU 270 may detect, respectively, a linear acceleration and a speed of rotation of the UE 280. The linear acceleration and speed of rotation measurements of the UE 280 may be integrated over time to determine an instantaneous direction of motion as well as a displacement of the UE 280. The instantaneous direction of motion and the displacement may be integrated to track a location of the UE 280. For example, a reference position of the UE 280 may be determined for a moment in time and measurements from the accelerometer(s) 273 and the gyroscope(s) 274 taken after this moment in time may be used (e.g., in dead reckoning) to determine present position of the UE 280 based on movement (direction and distance) of the UE 280 relative to the reference location.

The magnetometer(s) 271 may determine magnetic field strengths in different directions which may be used to determine orientation of the UE 280. For example, the orientation may be used to provide a digital compass for the UE 280. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the one or more processors 210.

The transceiver 215 may include a wireless transceiver 240 configured to communicate with other devices through wireless connections. For example, the wireless transceiver 240 may include a wireless transmitter 242 and a wireless receiver 244 coupled to a first antenna 246 and a second antenna 250 for transmitting and/or receiving wireless signals 248 and 252, respectively, and transducing signals from the wireless signals 248 and 252 to wired (e.g., electrical and/or optical) signals and from wired (e.g., electrical and/or optical) signals to the wireless signals 248 and 252. The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals according to a variety of radio access technologies (RATs) such as cellular (e.g., 3GPP defined communications including 4G, LTE, 5G NR, 6G, and the like), IEEE 802.11 (including IEEE 802.11az), WiFi®, WiFi® Direct (WiFi®-D), Bluetooth®, Ultra-Wide Band (UWB) (including 802.15.4), etc. A "radio", as used herein, refers to a wireless transmitter and/or wireless receiver configured to communicate signals according to a specific RAT. The transceiver 215 may be communicatively coupled to the transceiver interface 214, e.g., by optical and/or electrical connection. The transceiver interface 214 may be at least partially integrated with the transceiver 215. The wireless transmitter 242 and the wireless receiver 244 may include multiple transmitters and/or multiple receivers, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 280. For example, the user interface 216 may store indications of analog and/or digital signals in the one or more memories 211 to be processed by DSP 231 and/or the general-purpose/application processor 230 in response to action from a user or a request from an application. Similarly, applications hosted on the UE 280 may store indications of analog and/or digital signals in the one or more memories 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also, or alternatively, the user interface 216 may comprise one or more touch sensors responsive to touching and/or pressure, e.g., on a keyboard and/or touch screen of the user interface 216.

The UE 280 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also, or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 280, motion of the UE 280, and/or relative position of the UE 280, and/or time. The PD 219 may work in conjunction with the one or more processors 210 and the one or more memories 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 280 using terrestrial-based signals (e.g., at least some of the wireless signals 248) for trilateration. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 280. The PD 219 may be configured to determine a relative motion or orientation by the UE 280 by comparing multiple images captured by the camera 218 and tracking how a common "point of interest" within the images moves between images. The PD 219 may be configured to use one or more other techniques (e.g., relying on the UE's self-reported location (e.g., part of the UE's position beacon)) for determining the location of the UE 280, and may use a combination of techniques (e.g., satellite and terrestrial positioning signals) to determine the location of the UE 280. The PD 219 may include one or more of the sensors 213 (e.g., gyroscope(s), accelerometer(s), magnetometer(s), etc.) that may sense orientation and/or motion of the UE 280 and provide indications thereof that the one or more processors 210 (e.g., the general-purpose/application processor 230 and/or the DSP 231) may be configured to use to determine motion (e.g., a velocity vector and/or an acceleration vector) of the UE 280. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, and/or another component of the UE 280, and may be provided by hardware, software, firmware, or various combinations thereof.

Figure 3:
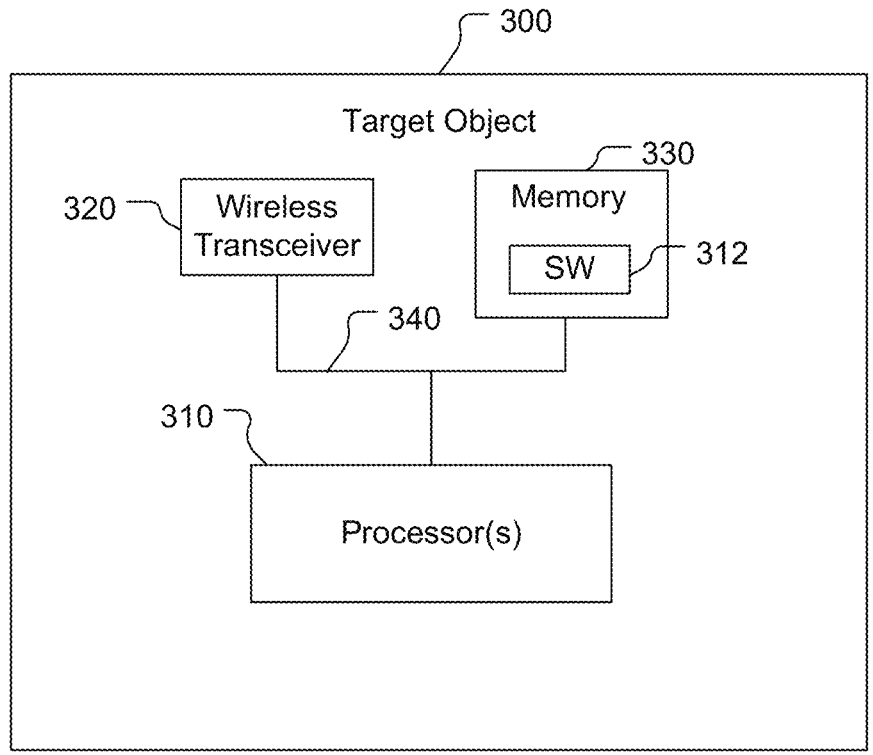
FIG. 3 illustrates an example of a target object.

FIG. 3 illustrates an example target object 300. The target object 300 may be an example of the target object 102. The target object 300 may comprise one or more processors 310, one or more memories 330 (possibly including SW 312), and one or more wireless transceivers 320, although any of these devices may be referred to in the singular (e.g., the processor 310) while including one or more of the respective devices. The one or more processors 310 and the one or more memories 330 may be communicatively coupled to each other by a bus 340 (which may be configured, e.g., for optical and/or electrical communication). The transceiver 320 may be configured for wireless communication using one or more RATs. For example, the transceiver 320 may be configured to wirelessly communicate with the transceiver 240 of the UE 200 using one or more RATs.

Figure 4:
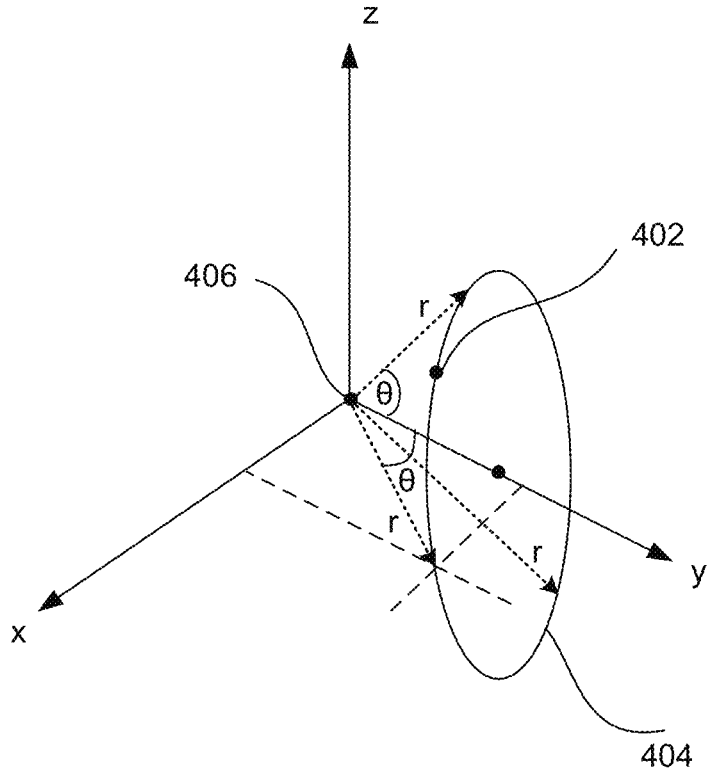
FIG. 4 illustrates an example determination of a two-dimensional angle of arrival (2D AoA).

In one embodiment, the UE 105 includes two antennas, the first antenna 246 and the second antenna 250. The UE 105 may not include a third antenna (or at least may not include a third antenna configured or employed in a way to perform positioning measurements or other positioning related tasks with respect to a target object 102). With two antennas, two-dimensional (2D) AoA may be determined. Referring to FIG. 4, with two antennas, the position of the target object 102 may be at any location (e.g., location 402) on a circle 404. The circle 404 may be defined from a position 406 of the UE 105 at distance r and at angles θ to the antenna vector, with the antenna vector being a direction from the first antenna 246 to the second antenna 250. Since a third antenna is not employed to further determine an AoA, the elevation or azimuth cannot be determined, and the location of the target object 102 on the circle 404 cannot be determined from a single position of the UE 105. To determine the location of the target object 102, information corresponding to a plurality of positions of the UE 105 may be used, as described herein.

FIG. 5 illustrates a flow diagram of an example method 500 for determining a location of the target object 102 by a UE 105 with two antennas using AoA. The method 500 may optionally include receiving a request to locate the target object 102 (block 510). For example, a user input requesting to locate the object is received through the user interface of the UE 105. The one or more processors 210, possibly in combination with the one or more memories 211, in combination with the user interface 216 may comprise means for receiving the request. The method 500 includes determining a plurality of position-orientation-distance-angle values, where each of the plurality of position-orientation-distance-angle values includes: a position of the user equipment relative to a reference position; an orientation of the user equipment relative to a reference orientation corresponding to the reference position; a distance between the position of the user equipment and the target object based on one or more wireless ranging signals between the user equipment and the target object; and an angle of the target object corresponding to the position and the orientation of the user equipment, the angle being an angle of arrival of the one or more wireless ranging signals at the first antenna and the second antenna of the user equipment, where a combination of the position and the orientation of the user equipment in each of the plurality of position-orientation-distance-angle values is different (block 520). In an example embodiment, a message is sent through the user interface 216 to instruct a user of the UE 105 to change the position and/or orientation of the UE 105. Each of the position-orientation-distance-angle values may comprise a position of the UE 105 relative to a reference position, an orientation of the UE 105, a distance corresponding to the position of the UE 105, and an angle corresponding to the position of the UE 105. The reference position may, for example, be a position of the UE 105, a position of another object or device, or a coordinate in three-dimensional space. The orientation of the UE 105 may include an orientation of the antenna vector in the direction from the first antenna 246 to the second antenna 250. The position of the UE 105 may be changed by changing the location of the UE 105, and the direction of the antenna vector may be changed by changing the orientation of the UE 105. When the position of the UE 105 is changed by changing both the relative position and the orientation of the UE 105, higher precision in the calculation of the position for the target object 102 may be realized. The precision in the calculation of the position for the target object 102 is described further below with reference to FIGS. 21-27. The distance is between the position of the UE 105 and the target object 102 and is measured using one or more wireless ranging signals between the UE 105 and the target object 102. Each combination of the position and orientation ("position-orientation") of the UE 105 in the position-orientation-distance-angle values is different. The positions-orientations that are different may be a subset of some, but not all, of the positions-orientations measured for the UE 105. For example, measured positions-orientations may include some measured positions-orientations that are the same and some measured positions-orientations that are different. The one or more processors 210, in combination with the one or more memories 211, may comprise means for determining the position-orientation of the UE 105. An exchange of "wireless ranging signal", as used herein, refers to an exchange of radio signals that supports the ability to determine a distance between two transceivers, (e.g., the transceiver 240 of the UE 105 and the transceiver 320 of the target object 102). For example, the wireless transceivers 240, 320 may exchange signals according to the WiFi®, Bluetooth®, or UWB protocols. For example, a time-of-flight (TOF) for the wireless ranging signal between the transceivers 240, 320 may be used to measure the distance between the UE 105 and the target object 102. For another example, a Received Signal Strength Indicator (RSSI) of the wireless ranging signal may be used to measure the distance between the UE 105 and the target object 102. For another example, a phase-based ranging that measures signal phase delay in the exchange of wireless ranging signals between the transceivers 240, 215 (e.g., Bluetooth® channel sounding) may be used to measure the distance between the UE 105 and the target object 102. The one or more processors 210, in combination with the one or more memories 211, in combination with the transceivers 240, 320, may comprise means for determining the distance between the position of the UE 105 and the target object 102. For example, an AoA for the wireless ranging signal from the transceiver 320 measured using the first antenna 246 and the second antenna 250 may be used to measure the angle corresponding to the position of the UE 105. The one or more processors 210, in combination with the one or more memories 211, in combination with the transceivers 240, 320, in combination with the first and second antennas 246, 250 may comprise means for determining the angle.

The method 500 includes calculating a position for the target object 102 using the plurality of position-orientation-distance-angle values, where the position of the target object 102 is relative to the reference position (block 530). The one or more processors 210, in combination with the one or more memories 211, may comprise means for calculating the position of the target object 102. For example, referring to FIGS. 1 and 5, a position $\vec{x}_0=(x_0, y_0, z_0)$ of the target object 102 is unknown, i.e., the target object 102 is "lost". In response to receiving a request to locate the target object 102, the one or more processors 210 establish wireless communication between the wireless transceiver 240 of the UE 105 and the wireless transceiver 320 of the target object 102, where one or more wireless ranging signals according to the one or more RATs, are exchanged. A position includes a location of the UE 105, $\vec{p}_i=(p_{xi}, p_{yi}, p_{zi})$, calculated corresponding to time $t_i$. An orientation includes an orientation of the UE 105, for example, an orientation of the antenna vector represented as a unit vector, $\vec{a}_i=(a_{xi}, a_{yi}, a_{zi})$, calculated corresponding to time $t_i$. A position $\vec{p}_1$ of the UE 105 at time $t_1$ may be set as the reference position. The orientation of the antenna vector $\vec{a}_i$ corresponding to the reference position may be set as the reference orientation. At time $t_1$, a distance $r_1$ between the UE 105 and the target object 102 is measured using the wireless ranging signal(s) between the UE 105 and the target object 102. Also at time $t_1$, an AoA $(\theta_1)$ is measured between the UE 105 and the target object 102 using the first and second antennas 246, 250 of the UE 105. For example, $\theta_1$ may be the angle between a vector $(\vec{x}_0-\vec{p}_1)$ and the vector $\vec{a}_1$. The position $\vec{p}_1$, the orientation $\vec{a}_1$, the distance $r_1$, and the angle $\theta_1$, are associated with each other as a position-orientation-distance-angle value based on time $t_1$. A position, $\vec{p}_2=(p_{x2}, p_{y2}, p_{z2})$, and orientation, $\vec{a}_2=(a_{x2}, a_{y2}, a_{z2})$, of the UE 105 corresponding to time $t_2$ is calculated, and a distance $r_2$ and an angle $\theta_2$ are measured, with $\vec{p}_2$, $\vec{a}_2$, $r_2$, and $\theta_2$ forming a second position-orientation-distance-angle value based on time $t_2$. A position, $\vec{p}_3=(p_{x3}, p_{y3}, p_{z3})$, and orientation, $\vec{a}_3=(a_{x3}, a_{y3}, a_{z3})$, of the UE 105 corresponding to time $t_3$ is calculated, and a distance $r_3$ and an angle $\theta_3$ is measured, with $\vec{p}_3$, $\vec{a}_3$, $r_3$, and $\theta_3$ forming a third position-orientation-distance-angle value based on time $t_3$. As the UE 105 changes positions and/or orientations, the calculation of the position-orientation of the UE 105, the measurement of the corresponding distance from the UE 105 to the target object 102, and the measurement of the AoA are repeated. A position, $\vec{p}_N=(p_{xN}, p_{yN}, p_{zN})$, and an orientation, $\vec{a}_N=(a_{xN}, a_{yN}, a_{zN})$, of the UE 105 corresponding to time $t_N$ is calculated, a distance $r_N$ is measured, and an angle $\theta_N$ is measured, with $\vec{p}_N$, $\vec{a}_N$, $r_N$, and $\theta_N$ forming an $N^{th}$ position-orientation-distance-angle value based on time $t_N$. Each of the positions-orientations of the UE 105, $(\vec{p}_1, \vec{a}_1)$, $(\vec{p}_2, \vec{a}_2)$, $(\vec{p}_3, \vec{a}_3)$, . . . , $(\vec{p}_N, \vec{a}_N)$, may be determined relative to the reference position-orientation. Each of the positions-orientations, $(\vec{p}_1, \vec{a}_1)$, $(\vec{p}_2, \vec{a}_2)$, $(\vec{p}_3, \vec{a}_3)$, . . . , $(\vec{p}_N, \vec{a}_N)$, of the UE 105 may be determined by the PD 219, as described above with reference to FIG. 2B. The position $\vec{x}_0$ of the target object 102 may be calculated (e.g., by the processor(s) 210) using the position-orientation-distance-angle values.

Figure 6:
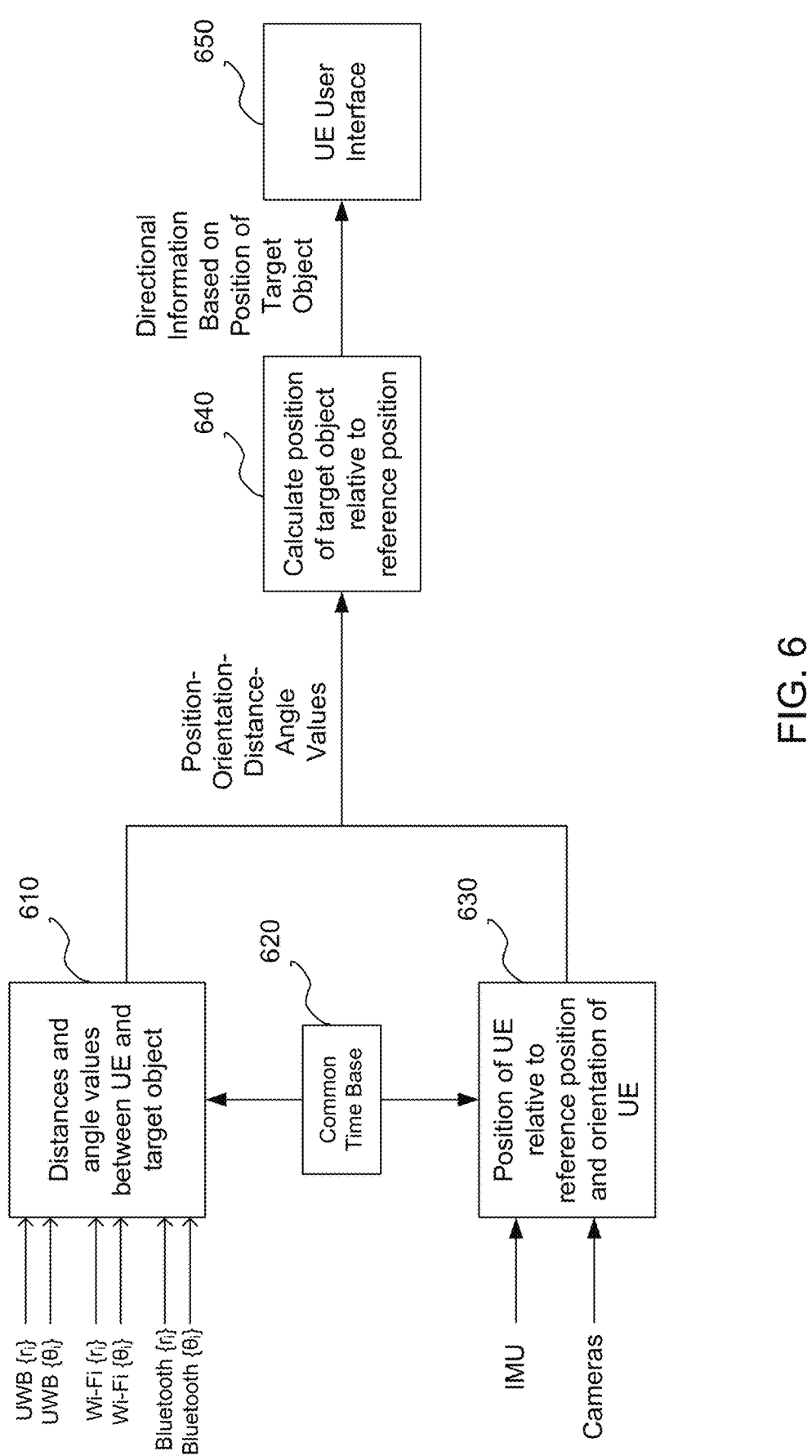
FIG. 6 illustrates an example information flow for determining and indicating a location of the target object.

FIG. 6 illustrates an example information flow for locating a target object by a UE 105 with two antennas using AoA. Dead-reckoning positions 630 of the UE 105, relative to the reference position and the orientations of the antenna vector of the UE 105, may be calculated by the PD 219 in conjunction with the one or more processors 210 and the one or more memories 211, using information from the sensor(s) 213. Images may be captured by the camera 218, and the information obtained from the processing of these images may be used in combination with the information from the sensor(s) 213 to determine the position and/or orientation of the UE 105, which may provide greater accuracy than without using images from the camera 218. Information determined from measuring the wireless ranging signals (e.g., UWB, 802.11az, BT Channel Sounding signals) exchanged between the UE 105 and the target object 102 may be used to measure the distances and angles 610 between the UE 105 and the target object 102. Each distance and angle 610, and position and orientation 630, correspond to each other according to a common time base 620 and together form a position-orientation-distance-angle value. Multiple position-orientation-distance-angle values may be processed (e.g., by the processor(s) 210) according to the method 500 to calculate the position of the target object 102 relative to the reference position (640). The processor(s) 210 may use the calculated position of the target object 102 and the present position and orientation of the UE 105 to determine a direction of the target object relative to the UE 105. The processor(s) 210 may determine directional information, e.g., direction and distance of the target object 102 relative to the UE 105, and provide the directional information to a UE user interface 650 (e.g., user interface 216). The UE user interface 650 may provide one or more indications (e.g., one or more visual indications and/or one or more verbal indications) as to the direction and distance of the target object 102 relative to the UE 105.

In one example embodiment, the one or more processors on the UE 105, executing instructions/code stored in the one or more memories 211, implement the method 500. In another example embodiment, the UE 105 sends the position-orientation-distance-angle values to a network computing device over a network connection for processing, where one or more processors of the network computing device, executing instructions/code stored on one or more memories of the network computing device, implement the method 500. In another example embodiment, the UE 105 sends the position-orientation-distance-angle values to a local computing device, such as over a device-to-device wired or wireless connection, where one or more processors of the local computing device, executing instructions/code stored on one or more memories of the local computing device, implement the method 500. The one or more processors implementing the method 500 may return the position of the target object 102 to the UE 105.

Figure 7:
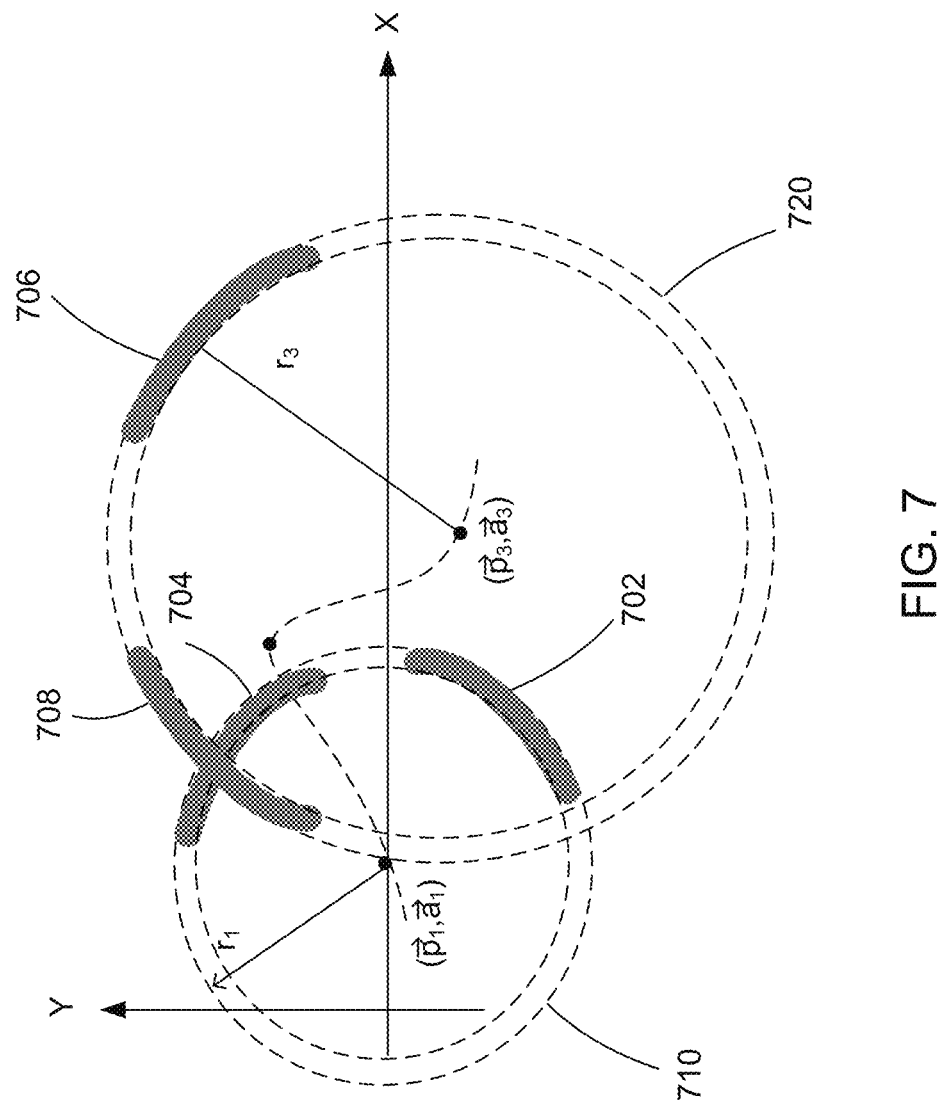
FIG. 7 shows a graphical representation of the calculation of the position of the target object using 2D AoA.

FIG. 7 shows a graphical representation of a calculation of a position of the target object 102 using determined position-orientation-distance-angle values, using a simplified 2D diagram with two position-distance-angle values. For the position-orientation $(\vec{p}_1, \vec{a}_1)$ of the UE 105 and distance $r_1$ to the target object 102, a circle 710 defines possible positions $\vec{x}_0$ of the target object. For a UE 105 with two antennas 246, 250, from the angle $\theta_1$, the possible positions $\vec{x}_0$ of the target object 102 is defined by two segments 702, 704 of the circle 710, which represent the AoA confidence interval for the position-orientation $(\vec{p}_1, \vec{a}_1)$. The two segments 702, 704 represent a three-dimensional space within which the target object 102 is estimated to be located based on the position-orientation $(\vec{p}_1, \vec{a}_1)$. For the position-orientation $(\vec{p}_3, \vec{a}_3)$ of the UE 105 and distance $r_3$ to the target object 102, a circle 720 defines possible positions $\vec{x}_0$ of the target object. From the angle $\theta_3$, the possible positions $\vec{x}_0$ of the target object 102 is defined by two segments 706, 708 of the circle 720, which represent the AoA confidence interval for the position-orientation $(\vec{p}_3, \vec{a}_3)$. The two segments 706, 708 represent a three-dimensional space within which the target object 102 is estimated to be located based on the position-orientation $(\vec{p}_3, \vec{a}_3)$. Segment 704 of circle 710 intersects with segment 708 of circle 720, indicating possible positions of the target object 102. Because the positions, orientations, distances, and angles may not be exact (e.g., have some error), the boundaries of each circle 710, 720 may have a "thickness", i.e., the boundaries may be a range of values. The intersections of the circles 710, 720 provide a three-dimensional space within which the target object 102 is estimated to be located. As additional position-orientation-distance-angle values are determined, and more circles representing the corresponding three-dimensional spaces are added, the size of the space may become smaller and thus the position estimate of the target object 102 may become more precise.

Figure 8:
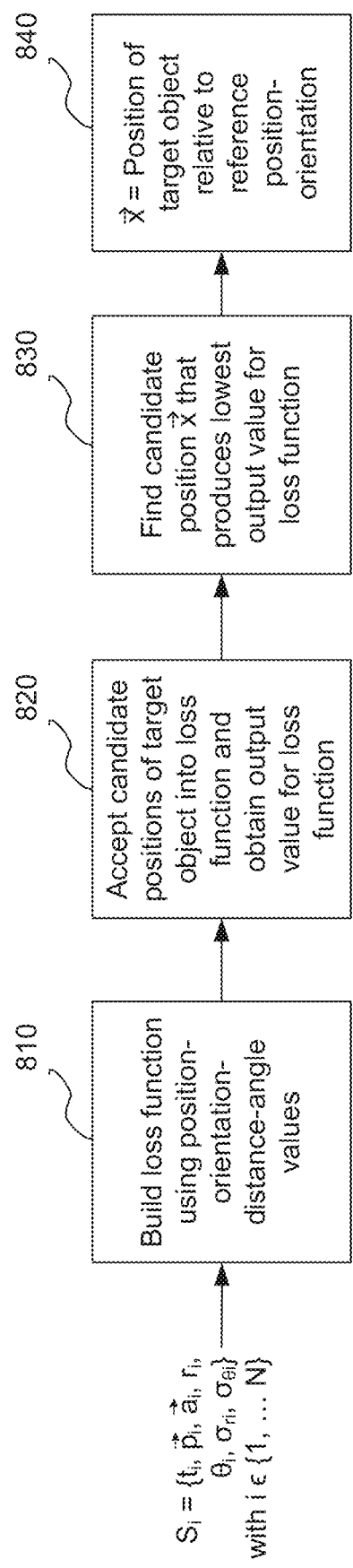
FIG. 8 illustrates an example of a calculation of the position of the target object using 2D AoA.

FIG. 8 illustrates an example of a calculation of the position of the target object 102 using AoA. The calculations illustrated with reference to FIG. 8 may be an example of the calculation illustrated in block 530 of FIG. 5. The one or more processors 210 may calculate N positions-orientations of the UE 105 (i.e., $(\vec{p}_l, \vec{a}_l)=\{(\vec{p}_1, \vec{a}_1), (\vec{p}_2, \vec{a}_2), (\vec{p}_3, \vec{a}_3), \ldots , (\vec{p}_N, \vec{a}_N)\}$, where the position-orientation $(\vec{p}_l, \vec{a}_l)$ is relative to the reference position-orientation. Each position-orientation $(\vec{p}_l, \vec{a}_l)$ represents the position and orientation of the UE 105 in three-dimensional space (e.g., $(\vec{p}_l, \vec{a}_l)=((\vec{p}_{xl}, \vec{a}_{xl}), (\vec{p}_{yl}, \vec{a}_{yl}), (\vec{p}_{zl}, \vec{a}_{zl})))$. The one or more processors 210 may measure distances (i.e., $r_i=\{r_1, r_2, r_3, \ldots , r_n\}$) between the positions $(\vec{p}_l)$ of the UE 105 and the target object 102 using one or more wireless ranging signals transferred between the UE 105 and the target object 102 and measure angles (i.e., $\theta_i=\{\theta_1, \theta_2, \theta_3, \ldots , \theta_n\}$). Each distance $r_i$ and angle $\theta_i$ correspond to a position $(\vec{p}_l)$ and a time or a time period (i.e., $t_i=\{t_1, t_2, t_3, \ldots , t_n\}$). Each corresponding position $\vec{p}_l$, orientation $\vec{a}_l$, distance $r_i$, and angle $\theta_i$ form a position-orientation-distance-angle value. As illustrated in FIG. 8, the one or more processors 210 may use the position-distance-angle values $s_i$ to build a loss function $\Lambda(\vec{x})$ as an array of N samples (block 810):

$$s_i = \left\{ t_i, \vec{p}_i, \vec{a}_i, r_i, \theta_i, \sigma_{ri}, \sigma_{\theta i} \right\} \text{ with } i \in \{1, \ldots , N\},$$

where the elements of si are as follows:

$t_i$=time at which the UE 105 is at position $\vec{p}_i$ and distance $r_i$ from the target object 102

$\vec{p}_l$=relative position of the UE 105, relative to the reference position, at time $t_i$ $\vec{a}_l$=orientation of the antenna vector, relative to the reference orientation, in the direction from the first antenna 246 to the second antenna 250, at time $t_i$, represented by a unit vector $r_i$=distance (e.g., time-of-flight distance) between the UE 105 and the target object 102 at time $t_i$ $\theta_i$=angle (e.g., AoA) measured between the UE 105 and the target object 102 at time $t_i$ $\sigma_{ri}$=standard deviation of the distance $r_i$ measurement taken at $t_i$ $\sigma_{\theta i}$=standard deviation of the angle $\theta_i$ measurement taken at $t_i$ The one or more processors 210 accepts candidate positions into the loss function $\Lambda(\vec{x})$ (block 820), finds a candidate position $\vec{x}$ that produces the lowest output value for the loss function (block 830) (i.e., minimizes the loss function), and determines the candidate position $\vec{x}$ as the position of the target object 102 relative to the reference position (block 840). The position $\vec{x}$ represents the position of the target object 102 in three-dimensional space (i.e., $\vec{x}=(x, y, z)$). For example, a gradient descent method may be used to minimize the loss function $\Lambda(\vec{x})$ to calculate the value of $\vec{x}$. Gradient descent is an iterative process that computes a series of approximations of the position $\vec{x}$ of the target object 102 that gradually approach the solution. Each approximation is computed from the previous approximation. For time $t_1$, where the position-orientation of the UE 105 is $(\vec{p}_l, \vec{a}_l)=((p_x, p_y, p_z), (a_x, a_y, a_z))$, and the position $\vec{x}$ of the target object 102 is $(x, y, z)$, a distance $\rho_i$ may be given by:

$$\rho_i = \left\| \vec{x} - \vec{p}_i \right\| = \sqrt{(x - p_x)^2 + (y - p_y)^2 + (z - p_z)^2} \qquad \text{(Eq. 1)}$$

A loss function for a single position-orientation-distance-angle value may then be built that considers $r_i$ (TOF information) and $\theta_i$ (AoA information):

$$\Lambda_i(\vec{x}) = \Lambda_i^{TOF}(\vec{x}) + \Lambda_i^{AoA}(\vec{x}) \qquad \text{(Eq. 2)}$$

where $$\Lambda_i^{TOF}(\vec{x}) = \frac{1}{2}\left(\frac{\rho_i - r_i}{\sigma_{ri}}\right)^2 = \frac{1}{2}\left(\frac{\|\vec{x} - \vec{p_i}\| - r_i}{\sigma_{ri}}\right)^2, \qquad \text{(Eq. 3)}$$

$$\Lambda_i^{AoA}(\vec{x}) = \frac{1}{2}\left(\frac{\alpha_i - \theta_i}{\sigma_{\theta \ast i}}\right)^2 \sin^2(\theta_i), \qquad \text{(Eq. 4)}$$

and $$\alpha_i = \arccos\left(\frac{(\vec{x} - \vec{p_i}) \cdot \vec{a_i}}{\|(\vec{x} - \vec{p_i})\| \cdot \|\vec{a_i}\|}\right). \qquad \text{(Eq. 5)}$$

A loss function for N position-orientation-distance-angle values may be derived:

$$\qquad \text{(Eq. 6)}$$

$$\Lambda(\vec{x}) =$$

$$\sum_{i=1}^{N}\left\{\frac{1}{2}\left(\frac{\|\vec{x} - \vec{p_i}\| - r_i}{\sigma_{ri}}\right)^2 + \frac{1}{2}\left(\frac{\arccos\left(\frac{(\vec{x} - \vec{p_i}) \cdot \vec{a_i}}{\|(\vec{x} - \vec{p_i})\| \cdot \|\vec{a_i}\|}\right) - \theta_i}{\sigma_{\theta i}}\right)^2\right\},$$

which may be minimized to calculate a position $\vec{x}$ of the target object 102. In one example, the distance $r_i$ and angle $\theta_i$ may not both be available at the same times $t_i$. For example, the distance $r_i$ measurements may be available at times $t_1$, $t_3$, $t_5$ . . . , while the angle $\theta_i$ measurements may be available at times $t_2$, $t_4$, $t_6$ . . . . If a specific distance value $r_i$ or specific angle value $\theta_i$ is not available for a specific position-orientation-distance-angle value, then the specific distance $r_i$ or specific angle $\theta_i$ would be removed from the loss function $\Lambda(\vec{x})$. When the TOF information is not available, the loss function may be derived using the AoA information:

$$\Lambda(\vec{x}) = \sum_{i=1}^{N}\left\{\frac{1}{2}\left(\frac{\arccos\left(\frac{(\vec{x} - \vec{p_i}) \cdot \vec{a_i}}{\|(\vec{x} - \vec{p_i})\| \cdot \|\vec{a_i}\|}\right) - \theta_i}{\sigma_{\theta i}}\right)^2\right\}. \qquad \text{(Eq. 7)}$$

In an example embodiment, different distances $r_i$ and angles $\theta_i$ may be measured using different RATs. For example, the $i^{th}$ measurement may be measured using a high accuracy UWB radio, while the $j^{th}$ measurement may be measured using a Bluetooth radio with lower accuracy. The accuracy of the distance and angle measurements may be modeled with their corresponding standard deviations $\sigma_r$ and $\sigma_\theta$, where $\sigma_{ri} < \sigma_{rj}$ and $\sigma_{\theta i} < \sigma_{\theta j}$. Different values of $\sigma_r$ and $\sigma_\theta$ may be used in each term of the loss function, depending on which radio was used to generate the distance $r_i$ and angle $\theta_i$ measurements.

In an example embodiment, the angles, $\theta_i$, are not measured directly by the UE 105. Instead, the UE 105 measures the phase delay $\Phi$ of the wireless ranging signals received by the first antenna 246 relative to the second antenna 250 of the UE 105. A non-linear mathematical formula may then be used to determine the angle $\theta$:

$$\theta = \arccos\left\{\frac{\Phi\lambda}{2\pi L}\right\}, \qquad \text{(Eq. 8)}$$

where $\lambda$ is the wavelength of the wireless ranging signals and L is the separation between the first and second antennas 246, 250.

Figure 9:
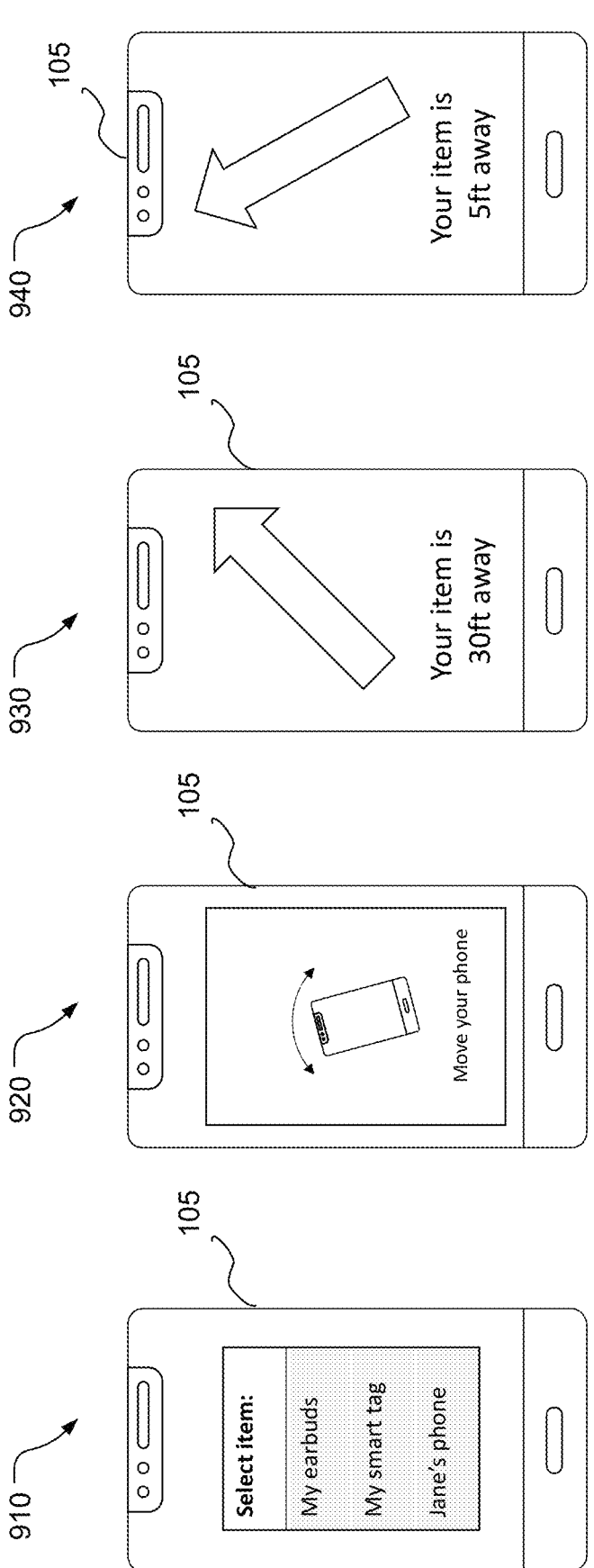
FIG. 9 illustrates an example user experience in locating the target object.

FIG. 9 illustrates an example user experience in locating the target object 102, e.g., using embodiments of the method 500. In this example, the UE 105 is a mobile device with one or more processors (e.g., the processor(s) 210) executing an application (e.g., the software 212) stored in one or more memories (e.g., the memories 211). A user of the UE 105 executes the application, and the application displays an image 910, on the user interface of the UE 105, that provides a list of items that support wireless ranging signals. The user selects one of the items as the target object 102. In response to receiving the selection of the target object 102, the application executing on the UE 105 causes a communication link between the transceivers of the UE 105 and the target object 102 to be established (e.g., between the transceivers 240, 320). The application displays an image 920 on the user interface with instructions for the user to change the position and/or orientation of the UE 105. As the UE 105 changes positions and/or orientations, the application executes the method 500 as described above, including calculating the position of the target object 102. The application causes directional information to be displayed on the user interface as an image 930 based on the position of the target object 102 and the orientation of the UE 105. As the user continues to change the position and/or orientation of the UE 105, the position of the target object 102 is updated. The application displays updated directional information in an image 940 based on the updated position of the target object 102 and an updated orientation of the UE 105.

Figures 10A, 10B:
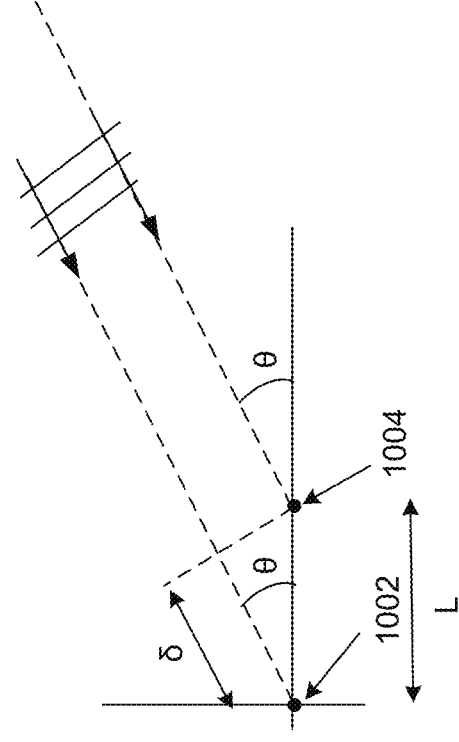
FIG. 10A illustrates a coordinate system for the reception of a signal by a first and a second antenna of the user equipment.
FIG. 10B illustrates the relationship between a spatial angle $\theta$ and a phase delay $\Phi$ for different antenna separation distances L.
Figure 11:
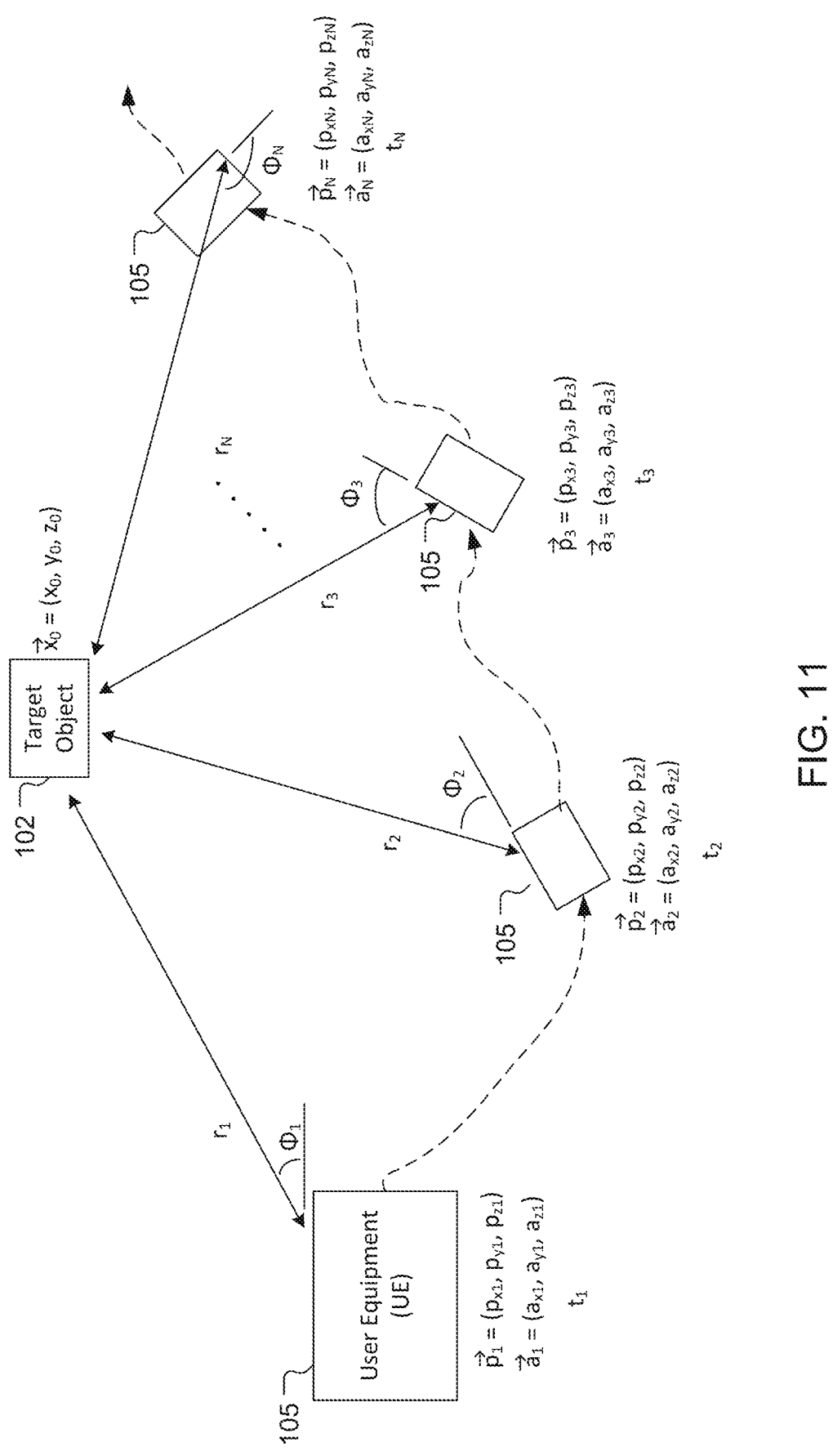
FIG. 11 is a simplified diagram of a second example system including a user equipment and a target object to be found.

In the above example embodiment, the distance (L) between the first antenna 246 and the second antenna 250 of the UE 105 may be assumed to be less than $\lambda/2$, where $\lambda$ is the wavelength of the wireless ranging signal. In another example embodiment, the position of the target object 102 may be obtained when the distance (L) between the first antenna 246 and the second antenna 250 of the UE 105 is greater than $\lambda/2$. FIG. 10A illustrates a coordinate system for the reception of a signal by the first and second antennas 246, 250. Both the first and second antennas 246, 250 receive the same wireless signal at a spatial angle $\theta$. The first antenna 246 receives a wireless signal at reception point 1002, and the second antenna 250 receives the same wireless signal at reception point 1004. L is the separation between the first antenna 246 and the second antenna 250. The wireless signal received by the first antenna 246 travels an extra distance $\delta$ than the wireless signal received by the second antenna 250, with $\delta = L \cdot \cos \theta$. The phase delay $\Phi$ of the wireless signal received by the first antenna 246 is dependent on the spatial angle $\theta$. FIG. 10B illustrates the relationship between the spatial angle $\theta$ and the phase delay $\Phi$ for different antenna separation distances L. When $L = \lambda/4$ and $L = \lambda/2$, the phase delay $\Phi$ corresponds to one spatial angle $\theta$. However, when L becomes larger than $\lambda/2$, such as $L = 6\lambda/10$, $L = 7\lambda/10$, or $L = 2\lambda$, the spatial angles $\theta$ have aliasing, where the phase delay $\Phi$ corresponds to multiple spatial angles $\theta$. The aliasing of the spatial angles $\theta$ injects ambiguity into the calculation of the position of the target object 102. To address the ambiguity, referring to FIG. 11, the phase delays $\Phi_i$ between the first and second antennas 246, 250 at times $t_i$ is measured at each position-orientation $(\vec{p}_i, \vec{a}_i)$ of the UE 105.

FIG. 12 is a flow diagram of an example method 1200 for determining a location of the target object 102 by a UE 105 with two antennas using a phase delay. The method 1200 optionally includes receiving a request to locate the target object 102 (block 1210). For example, a user input requesting to locate the object is received through the user interface of the UE 105. The one or more processors 210, possibly in combination with the one or more memories 211, in combination with the user interface 216 may comprise means for receiving the request. The method 1200 includes determining a plurality of position-orientation-distance-phase values, each of the plurality of position-orientation-distance-phase values comprising: a position of the user equipment relative to a reference position; an orientation of the user equipment relative to a reference orientation corresponding to the reference position; a distance corresponding to the position of the user equipment, the distance being between the position of the user equipment and the target object based on one or more wireless ranging signals between the user equipment and the target object; and a phase corresponding to the position and the orientation of the user equipment, the phase being a phase delay of arrival of the one or more wireless ranging signals between the first antenna and the second antenna, wherein a combination of the position and the orientation of the user equipment in each of the plurality of position-orientation-distance-phase values is different (block 1220). In an example embodiment, a message is sent through the user interface 216 to instruct a user of the UE 105 to change the position and/or orientation of the UE 105. Each of the position-orientation-distance-phase values may comprise a position of the UE 105 relative to a reference position, an orientation of the UE 105, a distance corresponding to the position of the UE 105, and a phase corresponding to the position of the UE 105. The reference position may, for example, be a position of the UE 105, a position of another object or device, or a coordinate in three-dimensional space. The orientation of the UE 105 may include the antenna vector in the direction from the first antenna 246 to the second antenna 250. The position of the UE 105 may be changed by changing the location of the UE 105. The direction of the antenna vector may be changed by changing the orientation of the UE 105. When the position of the UE 105 is changed by changing both the relative position and the orientation of the UE 105, higher precision in the calculation of the position for the target object 102 may be realized. The precision in the calculation of the position for the target object 102 is described further below with reference to FIGS. 21-27. The distance is between the position of the UE 105 and the target object 102 and is measured using one or more wireless ranging signals between the UE 105 and the target object 102. Each position-orientation of the UE 105 in the position-orientation-distance-phase values is different. The positions that are different may be a subset of some, but not all, of the positions-orientations measured for the UE 105. For example, measured positions-orientations may include some measured positions-orientations that are the same and some measured positions-orientations that are different. The one or more processors 210, in combination with the one or more memories 211, may comprise means for determining the position-orientation of the UE 105. An exchange of "wireless ranging signal", as used herein, refers to an exchange of radio signals that supports the ability to determine a distance between two transceivers, (e.g., the transceiver 240 of the UE 105 and the transceiver 320 of the target object 102). For example, the wireless transceivers 240, 320 may exchange signals according to the WiFi®, Bluetooth®, or UWB protocols. For example, a time-of-flight (TOF) for the wireless ranging signal between the transceivers 240, 320 may be used to measure the distance between the UE 105 and the target object 102. For another example, a Received Signal Strength Indicator (RSSI) of the wireless ranging signal may be used to measure the distance between the UE 105 and the target object 102. For another example, a phase-based ranging that measures signal phase delay in the exchange of wireless ranging signals between the transceivers 240, 215 (e.g., Bluetooth® channel sounding) may be used to measure the distance between the UE 105 and the target object 102. The one or more processors 210, in combination with the one or more memories 211, in combination with the transceivers 240, 320, may comprise means for determining the distance between the position of the UE 105 and the target object 102. For example, the phase delay between wireless ranging signals received by the first and second antennas 246, 250, corresponding to the position of the UE 105, may be measured. The AoA for the wireless signals may be calculated using the phase delay. The one or more processors 210, in combination with the one or more memories 211, in combination with the transceivers 240, 320, in combination with the first and second antennas 246, 250 may comprise means for determining the phase delay and means for calculating the AoA.

The method 1200 includes calculating a position for the target object 102 using the plurality of position-orientation-distance-phase values, where the position of the target object 102 is relative to the reference position (block 1230). The one or more processors 210, in combination with the one or more memories 211, may comprise means for calculating the position of the target object 102. For example, referring to FIGS. 11 and 12, a position $\vec{x}_0 = (x_0, y_0, z_0)$ of the target object 102 is unknown, i.e., the target object 102 is "lost". In response to receiving a request to locate the target object 102, the one or more processors 210 establish wireless communication between the wireless transceiver 240 of the UE 105 and the wireless transceiver 320 of the target object 102, where one or more wireless ranging signals according to the one or more RATs, are exchanged. A position includes a location of the UE 105, $\vec{p}_i = (p_{xi}, p_{yi}, p_{zi})$, calculated corresponding to time $t_i$. An orientation includes an orientation of the UE 105, for example, an orientation of the antenna vector represented as a unit vector, $\vec{a}_i = (a_{xi}, a_{yi}, a_{zi})$, calculated corresponding to time $t_i$. A position $\vec{p}_1$ of the UE 105 at time $t_1$ may be set as the reference position. At time $t_1$, a distance $r_1$ between the UE 105 and the target object 102 is measured using the wireless ranging signal(s) between the UE 105 and the target object 102. Also at time $t_1$, a phase delay $\Phi_1$ for wireless signals received by the first and second antennas 246, 250 of the UE 105 is measured using the antenna vector $\vec{a}_1$. The position $\vec{p}_1$, orientation $\vec{a}_1$, distance $r_1$, and phase delay $\Phi_1$, are associated with each other as a position-orientation-distance-phase value based on time $t_1$. A position-orientation, $(\vec{p}_2 = (p_{x2}, p_{y2}, p_{z2}), a_2 = (a_{x2}, a_{y2}, a_{z2}))$, of the UE 105 corresponding to time $t_2$ is calculated, and a distance $r_2$ and a phase delay $\Phi_2$ are measured, with $\vec{p}_2, \vec{a}_2$, $r_2$, and $\Phi_2$ forming a second position-orientation-distance-phase value based on time $t_2$. A position-orientation, $(\vec{p_3}=(p_{x3}, p_{y3}, p_{z3}), \vec{a_3}=(a_{x3}, a_{y3}, a_{z3}))$, of the UE 105 corresponding to time $t_3$ is calculated, and a distance $r_3$ and a phase delay $\varphi_3$ is measured, with $\vec{p_3}$, $\vec{a_3}$, $r_3$, and $\Phi_3$ forming a third position-orientation-distance-phase value based on time $t_3$. As the UE 105 changes positions and/or orientations, the calculation of the position of the UE 105, the orientation of the UE 105, the measurement of the corresponding distance from the UE 105 to the target object 102, and the measurement of the phase delay are repeated. A position-orientation, $(\vec{p_N}=(p_{xN}, p_{yN}, p_{zN}), \vec{a_N}=(a_{xN}, a_{yN}, a_{zN}))$, of the UE 105 corresponding to time $t_N$ is calculated, a distance $r_N$ is measured, and a phase delay $\Phi_N$ is measured, with $\vec{p_N}$, $r_N$, and $\Phi_N$ forming an $N^{th}$ position-distance-phase value based on time $t_N$. Each of the positions of the UE 105, $(\vec{p_2}, \vec{a_2})$, $(\vec{p_3}, \vec{a_3})$, . . . , $(\vec{p_N}, \vec{a_N})$, may be determined relative to the reference position $(x_1, y_1, z_1)$. Each of the positions, $\vec{p_1}$, $\vec{p_2}$, $\vec{p_3}$, . . . , $\vec{p_N}$, of the UE 105 may be determined by the PD 219, as described above with reference to FIG. 2B. The position $\vec{x_0}$ of the target object 102 may be calculated (e.g., by the processor(s) 210) using the position-orientation-distance-phase values.

Figure 13:
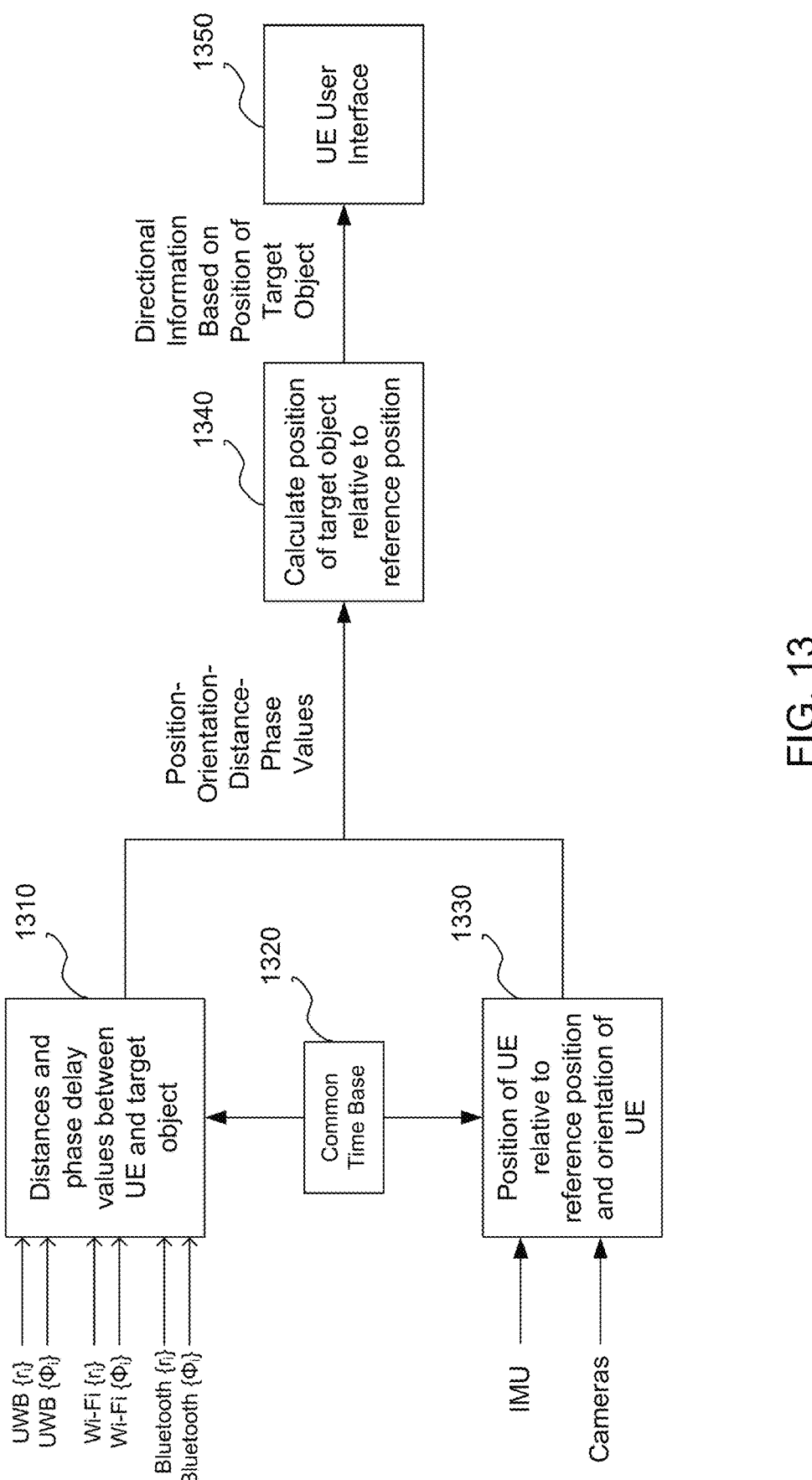
FIG. 13 illustrates an example information flow for determining and indicating a location of the target object using phase delay.

FIG. 13 illustrates an example information flow for locating a target object by a UE 105 with two antennas using a phase delay. Dead-reckoning positions 1330 of the UE 105, relative to the reference position, and the orientations of UE 105, may be calculated by the PD 219 in conjunction with the one or more processors 210 and the one or more memories 211, using information from the sensor(s) 213. Images may be captured by the camera 218, and the information obtained from the processing of these images may be used in combination with the information from the sensor(s) 213 to determine the position and/or orientation of the UE 105, which may provide greater accuracy than without using images from the camera 218. Information determined from measuring the wireless ranging signals (e.g., UWB, 802.11az, BT Channel Sounding signals) exchanged between the UE 105 and the target object 102 may be used to measure the distances between the UE 105 and the target object 102. Information determined from measuring the difference in the phase of the wireless ranging signals received by the first and second antennas 246, 250 of the UE 105 may be used to measure the phase delay. Each distance and phase delay 1310, and position and orientation 1330, correspond to each other according to a common time base 1320 and together form a position-orientation-distance-phase value. Multiple position-orientation-distance-phase values may be processed (e.g., by the processor(s) 210) according to the method 1200 to calculate the position of the target object 102 relative to the reference position (1340). The processor(s) 210 may use the calculated position of the target object 102 and the present position and orientation of the UE 105 to determine a direction of the target object relative to the UE 105. The processor(s) 210 may determine directional information, e.g., direction and distance of the target object 102 relative to the UE 105, and provide the directional information to a UE user interface 1350 (e.g., user interface 216). The UE user interface 1350 may provide one or more indications (e.g., one or more visual indications and/or one or more verbal indications) as to the direction and distance of the target object 102 relative to the UE 105.

In one example embodiment, the one or more processors on the UE 105, executing instructions/code stored in the one or more memories 211, implement the method 1200. In another example embodiment, the UE 105 sends the position-orientation-distance-phase values to a network computing device over a network connection for processing, where one or more processors of the network computing device, executing instructions/code stored on one or more memories of the network computing device, implement the method 1200. In another example embodiment, the UE 105 sends the position-orientation-distance-phase values to a local computing device, such as over a device-to-device wired or wireless connection, where one or more processors of the local computing device, executing instructions/code stored on one or more memories of the local computing device, implement the method 1200. The one or more processors implementing the method 1200 may return the position of the target object 102 to the UE 105.

Figure 14:
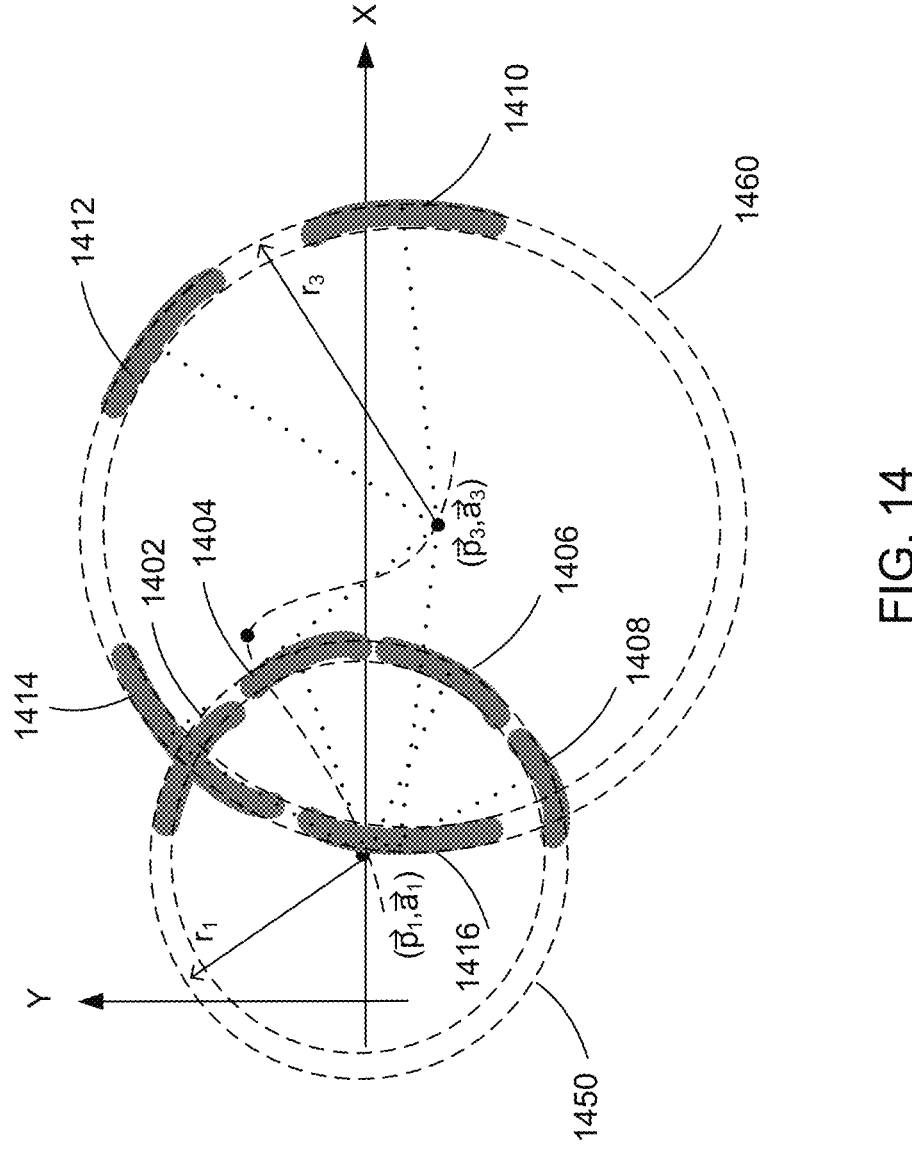
FIG. 14 illustrates an example of a calculation of the position of the target object using phase delay.

FIG. 14 shows a graphical representation of a calculation of a position of the target object 102 using determined position-orientation-distance-phase values, using a simplified 2D diagram with two position-distance-phase values. For the position-orientation $(\vec{p_1}, \vec{a_1})$ of the UE 105 and distance $r_1$ to the target object 102, a circle 1450 defines possible positions $\vec{x_0}$ of the target object. For a UE 105 with two antennas 246, 250 having a separation L greater than $\lambda/2$, and from the phase delay $\Phi_1$, the possible positions $\vec{x_0}$ of the target object 102 is defined by four segments 1402, 1404, 1406, 1408 of the circle 1450, which represent the AoA confidence interval for the position-orientation $(\vec{p_1}, \vec{a_1})$. The four segments 1402, 1404, 1406, 1408 represent a three-dimensional space within which the target object 102 is estimated to be located based on the position-orientation $(\vec{p_1}, \vec{a_1})$. For the position-orientation $(\vec{p_3}, \vec{a_3})$ of the UE 105 and distance $r_3$ to the target object 102, a circle 1460 defines possible positions $\vec{x_0}$ of the target object. From the phase delay $\Phi_3$, the possible positions $\vec{x_0}$ of the target object 102 is defined by four segments 1410, 1412, 1414, 1416 of the circle 1460, which represent the AoA confidence interval for the position-orientation $(\vec{p_3}, \vec{a_3})$. The four segments 1410, 1412, 1414, 1416 represent a three-dimensional space within which the target object 102 is estimated to be located based on the position-orientation $(\vec{p_3}, \vec{a_3})$. Segment 1402 of circle 1450 intersects with segment 1414 of circle 1460, indicating possible positions of the target object 102. Because the positions, distances, and phase delays may not be exact (e.g., have some error), the boundaries of each circle 710, 720 may have a "thickness", i.e., the boundaries may be a range of values. The intersections of the circles 1450, 1460 provide a three-dimensional space within which the target object 102 is estimated to be located. As additional position-orientation-distance-phase values are determined, and more circles representing the corresponding three-dimensional spaces are added, the size of the space may become smaller and thus the position estimate of the target object 102 may become more precise.

FIG. 15 illustrates an example of a calculation of the position of the target object 102 by a UE 105 with two antennas having a separation less than $\lambda/2$. The calculations illustrated with reference to FIG. 15 may be an example of the calculation illustrated in block 1230 of FIG. 12. The one or more processors 210 may calculate N positions-orientations of the UE 105 (i.e., $(\vec{p}_l, \vec{a}_l)=\{(\vec{p}_1, \vec{a}_1), (\vec{p}_2, \vec{a}_2), (\vec{p}_3, \vec{a}_3), \ldots, (\vec{p}_N, \vec{a}_N)\}$, where $\vec{p}_l$ is relative to the reference position. Each position-orientation $(\vec{p}_l, \vec{a}_l)$ represents the position and orientation of the UE 105 in three-dimensional space (e.g., $(\vec{p}_l, \vec{a}_l)=((p_{xl}, a_{xl}), (p_{yl}, a_{yl}), (p_{zl}, a_{zl})))$. The one or more processors 210 may measure distances (i.e., $r_i=\{r_1, r_2, r_3, \ldots, r_n\}$) between the positions $\vec{p}_l$ of the UE 105 and the target object 102 using one or more wireless ranging signals transferred between the UE 105 and the target object 102 and measure phase delays between the two antennas 246, 250 (i.e., $\Phi_i=\{\Phi_1, \Phi_2, \Phi_3, \ldots, \Phi_n\}$). Each distance $r_1$ and phase delay $\Phi_i$ correspond to a position-orientation $(\vec{p}_l, \vec{a}_l)$ and a time or a time period (i.e., $t_i=\{t_1, t_2, t_3, \ldots, t_n\}$). Each corresponding position $\vec{p}_l$, orientation $\vec{a}_l$, distance $r_i$, and phase delay $\Phi_i$ form a position-orientation-distance-phase value $s_i=\{t_i, \vec{p}_i, \vec{a}_i, r_i, \Phi_i\}$. As illustrated in FIG. 15, the one or more processors 210 may use the position-orientation-distance-phase values $s_i$ to build a loss function $\Lambda(\vec{x})$ as an array of N samples (block 1510):

$$s_i = \{t_i, \vec{p}_i, \vec{a}_i, r_i, \Phi_i, \sigma_{ri}, \sigma_{\theta i}\} \text{ with } i \in \{1, \ldots, N\},$$

where the elements of $s_i$ are as follows:

$t_i$=time at which the UE 105 is at position $\vec{p}_i$ and distance $r_i$ from the target object 102

$\vec{p}_i$=relative position of the UE 105, relative to the reference position, at time $t_i$ $\vec{a}_i$=orientation of the antenna vector, in the direction from the first antenna 246 to the second antenna 250, at time $t_1$, represented by a unit vector $r_i$=distance (e.g., time-of-flight distance) between the UE 105 and the target object 102 at time $t_i$ $\Phi_i$=phase delay measured between the two antennas 246, 250 of the UE 105 for wireless ranging signals from the target object 102 at time $t_i$ $\sigma_{ri}$=standard deviation of the distance $r_1$ measurement taken at $t_i$ $\sigma_{\Phi i}$=standard deviation of the phase delay $\Phi_i$ measurement taken at $t_i$ The one or more processors 210 accepts candidate positions into the loss function $\Lambda(\vec{x})$ (block 1520), finds a candidate position $\vec{x}$ that produces the lowest output value for the loss function (block 1530) (i.e., minimizes the loss function), and determines the candidate position $\vec{x}$ as the position of the target object 102 relative to the reference position (block 1540). The position $\vec{x}$ represents the position of the target object 102 in three-dimensional space (i.e., $\vec{x}=(x, y, z)$). For example, a gradient descent method may be used to minimize the loss function $\Lambda(\vec{x})$ to calculate the value of $\vec{x}$. Gradient descent is an iterative process that computes a series of approximations of the position $\vec{x}$ of the target object 102 that gradually approach the solution. Each approximation is computed from the previous approximation. A loss function for a single position-orientation-distance-phase value may then be built that considers $r_i$ (TOF information) and $\Phi_i$ (AoA information):

$$\Lambda_i(\vec{x}) = \Lambda_i^{TOF}(\vec{x}) + \Lambda_i^{AoA}(\vec{x}) \tag{Eq. 9}$$

where $$\Lambda_i^{TOF}(\vec{x}) = \frac{1}{2}\left(\frac{\rho_i - r_i}{\sigma_{ri}}\right)^2 = \frac{1}{2}\left(\frac{\|\vec{x}-\vec{p}_i\| - r_i}{\sigma_{ri}}\right)^2, \tag{Eq. 10}$$

$$\Lambda_i^{AoA}(\vec{x}) = \frac{1}{2}\left(\frac{\Delta(\varphi_i - \Phi_i)}{\sigma_{\Phi i}}\right)^2, \tag{Eq. 11}$$

where $\Delta(\;)$ is a function that computes the difference between the angles $\varphi_i$ and $\Phi_i$ and returns a value in the interval $(-\pi, \pi)$, $\sigma_{\Phi}$ is the standard deviation of the phase delay measurement, and $\varphi_i$ is the phase delay for candidate position $i^{th}$ measurement. A loss function for N position-distance-phase values may be derived:

$$\Lambda(\vec{x}) = \tag{Eq. 12}$$

$$\sum_{i=1}^{N}\left\{\frac{1}{2}\left(\frac{\|\vec{x}-\vec{p}_i\| - r_i}{\sigma_{ri}}\right)^2 + \frac{1}{2}\left(\frac{\Delta\left(\left[\frac{2\pi L}{\lambda}\frac{(\vec{x}-\vec{p}_i)\cdot\vec{a}_i}{\|\vec{x}-\vec{p}_i\|\cdot\|\vec{a}_i\|}\right]_{\pm\pi} - \Phi_i\right)_{\pm\pi}}{\sigma_{\Phi i}}\right)^2\right\},$$

where notation $[x]_{\pm\pi}$ is used to indicate that angle x must be kept in the interval $(-\pi, \pi)$ Equation 11 may also be used for a UE with three or more antennas available for phase measurements, where the antenna separation L is greater than $\lambda/2$ by adding more terms to the loss function for each pair of antennas. The loss function may be minimized to calculate a position $\vec{x}$ of the target object 102:

$$\vec{x_T} = \text{argmin}_{\vec{x}}\{\Lambda(\vec{x})\} = \tag{Eq. 13}$$

$$\text{argmin}_{\vec{x}}\left\{\sum_{i=1}^{N}\left\{\frac{1}{2}\left(\frac{\rho_i - r_i}{\sigma_{ri}}\right)^2 + \frac{1}{2}\left(\frac{\Delta(\varphi_i - \Phi_i)}{\sigma_{\Phi i}}\right)^2\right\}\right\},$$

where $\rho_i$ is defined by Equation 1. In another embodiment, Equation 11 may be used for a UE with three or more antennas available for phase measurements, where the antenna separation L is greater than $\lambda/2$ by adding more terms to the loss function for each pair of antennas.

Figure 16:
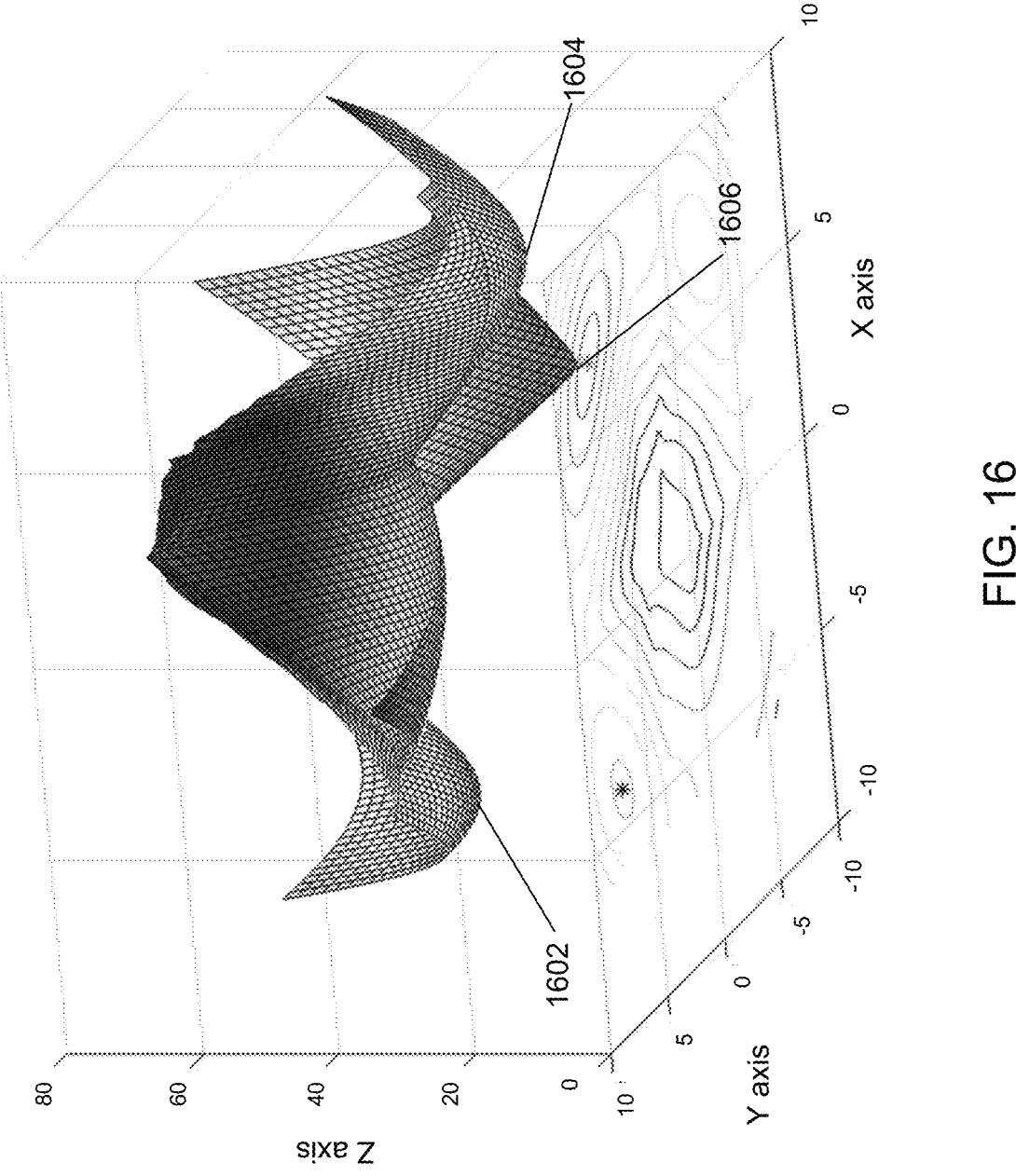
FIG. 16 illustrates an example loss function in a three dimensional graph, where a separation L between two antennas of the user equipment is greater than λ/2.
Figure 17:
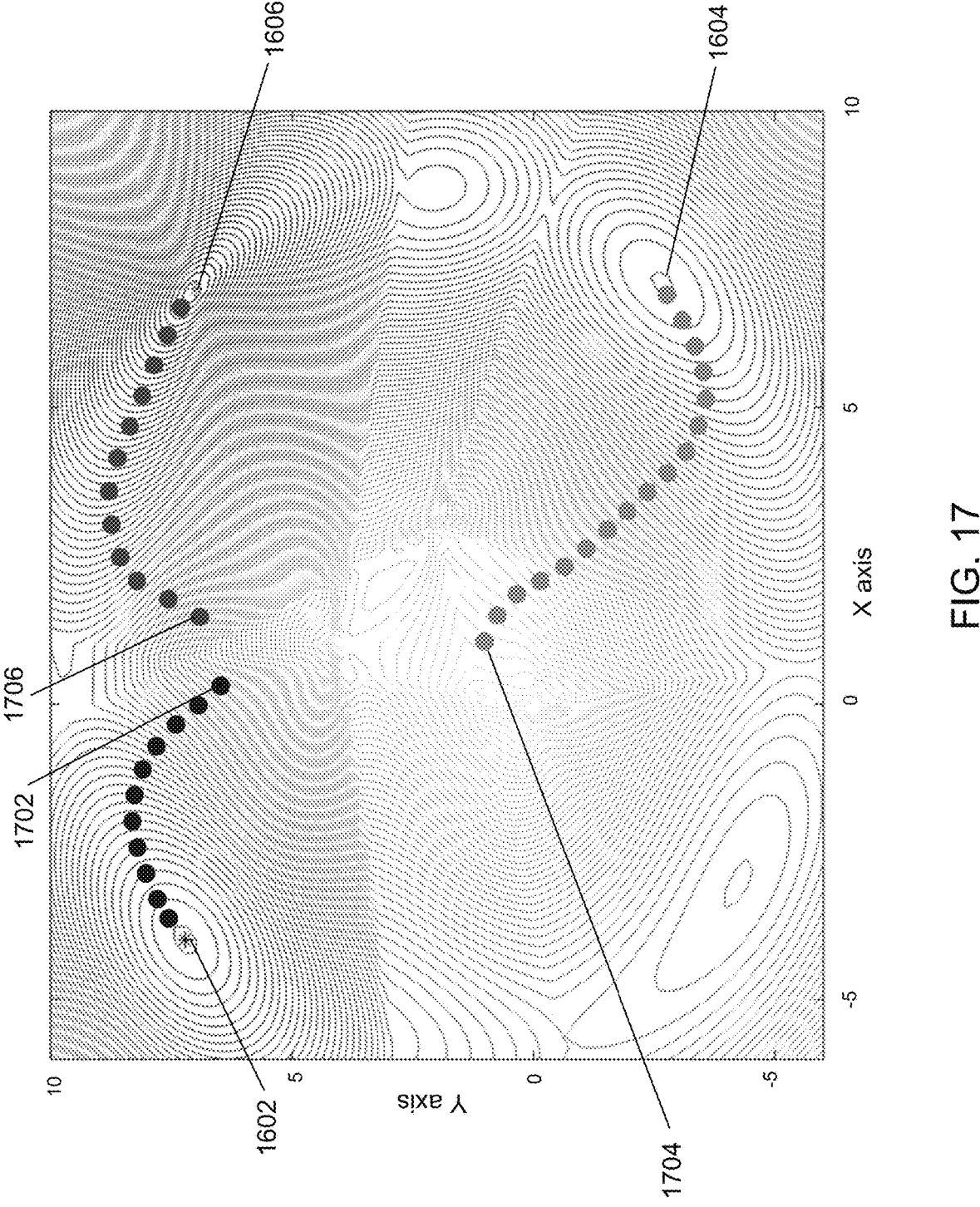
FIG. 17 illustrates the example loss function of FIG. 16 in a two dimensional contour plot.

When $L>\lambda/2$, the loss function is not convex, and the loss function is not guaranteed to have a single local minimum. The number of local minima increases as L becomes larger because more values of the spatial angle $\theta$ maps to the same phase $\Phi$. The effect of the number of local minima being more than one is that a gradient descent algorithm for minimizing the loss function may converge to a local minimum instead of the global minimum. FIG. 16 illustrates an example loss function in a two dimensional graph, where $L>\lambda/2$. In this example, the coordinate 1606 is the position of the target object 102 and also the global minimum for the loss function. The coordinates 1602 and 1604 are local minima. FIG. 17 illustrates the example loss function of FIG. 16 in a two dimensional contour plot. Depending on the starting point for a gradient descent algorithm, convergence may occur at a local minima or a global minimum. For example, from the starting points 1702 or 1704, convergence may occur at the local minima 1602 or 1604, respectively.

From the starting point 1706, convergence may occur at the global minimum 1606. To reduce the possibility of converging at a local minima, a method that combines a gradient descent algorithm and a genetic algorithm (GD-GA) may be used to minimize the loss function, as described further below with reference to FIGS. 18 and 19.

Figure 19:
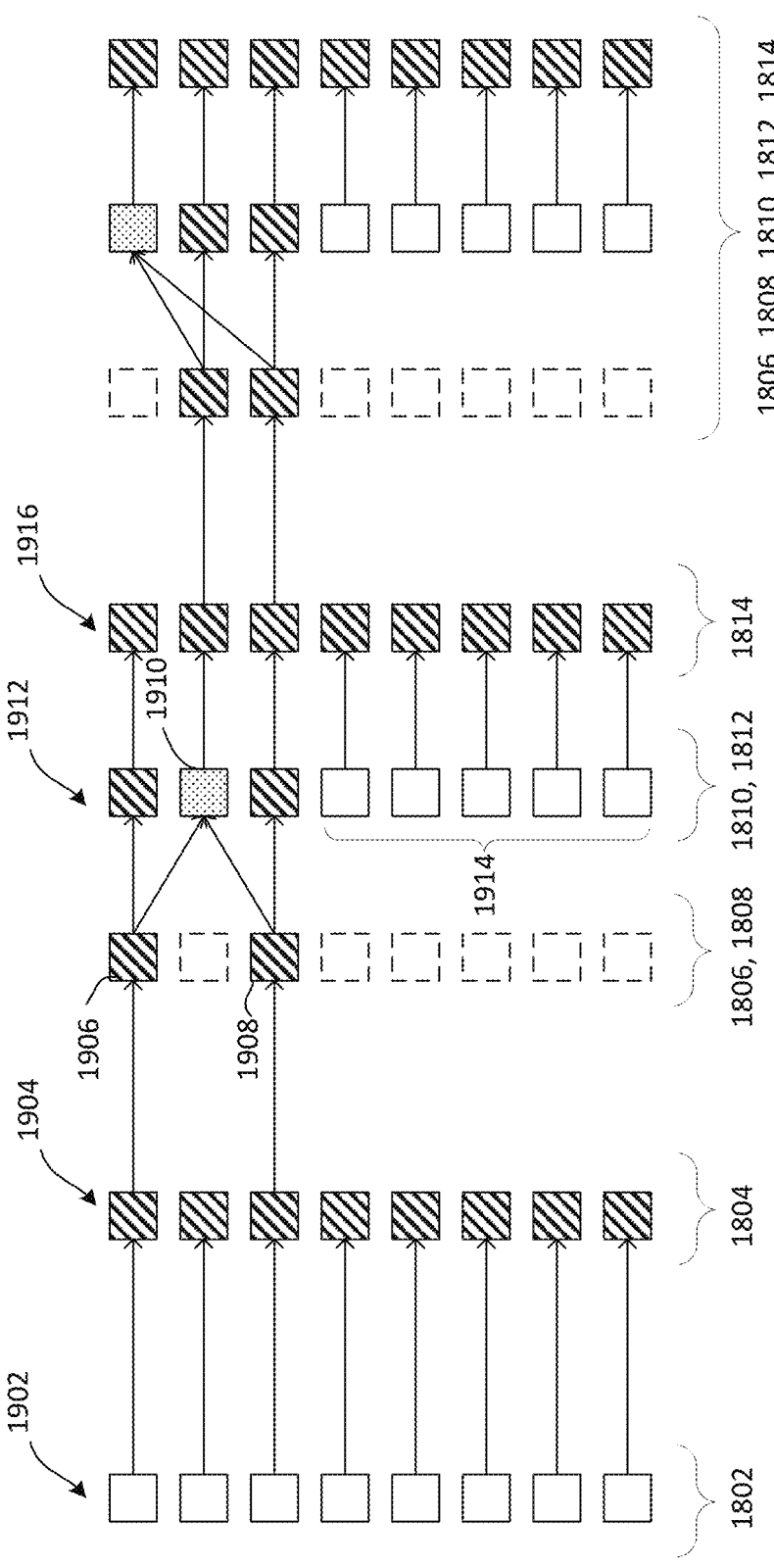
FIG. 19 illustrates an example GD-GA method illustrated in FIG. 18.

FIG. 18 illustrates an example GD-GA method of minimizing a loss function to determine a location of the target object. FIG. 19 illustrates a graphical example of the GD-GA method. Referring to both FIGS. 18 and 19, the method 1800 includes generating a pool of candidate positions 1902 comprising random candidate positions of the target object 102 (block 1802). For example, the random candidate positions may be positions within a configured distance of the UE 105. The one or more processors 210, in combination with the one or more memories 211, may comprise means for generating the pool of candidate positions 1902. The method 1800 includes executing a gradient descent of the loss function on each candidate position in the pool of candidate positions 1902, to form the pool of candidate positions 1904 (block 1804). The one or more processors 210, in combination with the one or more memories 211, may comprise means for executing the gradient descent of the loss function on each candidate position in the pool of candidate positions 1904. The method 1800 includes selecting a top number of candidate positions (e.g., 1906, 1908) from the pool of candidate positions 1904 with the lowest values of the loss function (block 1806). The one or more processors 210, in combination with the one or more memories 211, may comprise means for selecting the top number of candidate positions 1906, 1908 from the pool of candidate positions 1904 with the lowest values of the loss function. The method 1800 includes creating one or more new children candidate positions 1910 using a genetic cross-over of the top number of candidate positions 1906, 1908 (block 1808). The one or more processors 210, in combination with the one or more memories 211, may comprise means for creating the one or more new children candidate positions 1910 using the genetic cross-over of the top number of candidate positions 1906, 1908. The method 1800 includes creating a new pool of candidate positions 1912 to comprise the top number of candidate positions 1906, 1908 and the one or more new children candidate positions 1910 (block 1810). The one or more processors 210, in combination with the one or more memories 211, may comprise means for creating the new pool of candidate positions 1912 of the target object 102. The method 1800 includes filling a remainder of the new pool of candidate positions 1912 with one or more new random candidate positions 1914 (block 1812). For example, the random candidate positions may be positions within a configured distance of the UE 105. The one or more processors 210, in combination with the one or more memories 211, may comprise means for filling the remainder of the new pool of candidate positions 1912 with the one or more new random candidate positions 1914. The method 1800 includes performing the gradient descent on each candidate position in the new pool of candidate positions 1912, form the new pool of candidate positions 1916 (block 1814). The one or more processors 210, in combination with the one or more memories 211, may comprise means for performing the gradient descent on each candidate position in the new pool of candidate positions 1916. Additional iterations of the GD-GA, as described with reference to blocks 1806, 1808, 1810, 1812, and 1814, may be performed until a stop condition occurs (block 1816). The one or more processors 210, in combination with the one or more memories 211, may comprise means for performing additional iterations until the stop condition occurs. For example, the stop condition may be when the same candidate positions have been the top number of candidate positions for a configured number of iterations. For another example, the stop condition may be when a configured maximum number of iterations have been performed.

In an example embodiment, different weights may be applied to certain components of the loss function. When weights $q_i$ are applied, the loss function may be modified as follows:

$$\Lambda(\vec{x}) = \sum_{i=1}^{N} q_i \cdot \Lambda_i(\vec{x}) \qquad \text{(Eq. 14)}$$

Different weights may also be applied to different distance measurements by the same radio type based on one or more other parameters. For example, different measurements from the same radio type can have different standard deviations a depending on the distance between the UE 105 and the target object 102, where the larger the distance, the greater the value of the standard deviation $\sigma$. The weight $q_i$ may be calculated such that a smaller weight is applied to measurements taken at greater distance than measurements taken at a lesser distance. For example, the value of $\sigma$ may be applied using a lookup table or computed as a function of r as follows:

$$\sigma = f(r), \qquad \text{(Eq. 15)}$$

where the function $f(\ )$ varies depending on the specific operational parameters of the radio type.

Another example weight dependency is based on time of measurement. Measurements by the components of the UE 105, such as the IMU 270, the camera 218, etc., contain errors that may gradually increase over time. The larger the time difference between a time of a position measurement and a time of the reference position, the less accurate the position measurement is likely, and may be assumed, to be. The standard deviation $\sigma$ of the error may thus increase with time difference. The weight $q_i$ may be calculated such that a smaller weight is applied to later measurements than to earlier measurements. A formula for the weight $q_i$ may be based on a model of the source(s) of error in the measurements. For example, when the standard deviation $\sigma$ of the error increases exponentially with time, a possible equation for $q_i$ may be:

$$q_i = \exp\left\{-\frac{t_N - t_i}{\tau}\right\}, \qquad \text{(Eq. 16)}$$

where $\tau$ is a derived time constant. When position errors accumulate quickly, $\tau$ will have a smaller value than when position errors accumulate more slowly.

Another example weight dependency is based on a speed of movement of the UE 105. The UE 105 may move with varying speed. For example, some measurements may be taken with the UE 105 almost static while other measurements may be taken while the UE 105 is moving, e.g., while being shaken. The speed of movement of the UE 105 may affect the accuracy of the UE position $\vec{p}_l$. The weight $q_i$ may be calculated based on the standard deviation $\sigma$ of the measurement of position $\vec{p}_l$, such that measurements taken with a faster movement speed of the UE 105 are given lesser weight than measurements taken with a slower movement speed of the UE 105. For example, the standard deviation σ of the UE position measurement may be proportional to an instantaneous speed of the UE 105 when the measurement was taken. An example implementation of the weight $q_i$ may be:

$$q_i = \frac{1}{\sigma_r^2 + \sigma_v^2} \qquad \text{(Eq. 17)}$$

where $\sigma_r$ is the standard deviation for the TOF, AOA or PDOA measurement, and $\sigma_v$ is proportional to the speed of the UE 105 at time $t_i$.

Another example weight dependency is based on the movement of the target object 102. For example, if the target object 102 is able to detect movement of the target object 102, such as being configured with sensors similar to sensor(s) 213, the information (e.g., from the sensors) of the movement may be used to calculate the weight $q_i$. For example, if, after the measurement of the initial position-distance value, the target object 102 detects that the target object 102 has moved, the target object 102 may send a signal to the UE 105 to indicate the movement. In response, a smaller weight $q_i$ may be applied to measurements taken before the movement. The measurements taken before the movement may be discarded by applying a weight $q_i$=0.

Another example weight dependency is based on the wireless ranging signal strength. A radio may be configured with one or more mechanisms to determine the accuracy of measurements taken by the radio. For example, a radio may be configured with a mechanism to measure the degree of signal multipath in a physical environment. This information can be used to estimate the standard deviation $\sigma_i$ of the measurements taken by the radio. For another example, a transceiver may be configured to use a Received Signal Strength Indicator (RSSI) to perform an estimation of $\sigma_i$. The weight $q_i$ may be calculated such that a smaller weight is applied to signals with a larger $\sigma_i$. For example, the value of the weight $q_i$ may be calculated as:

$$q_i = \frac{1}{\sigma_i^2} \qquad \text{(Eq. 18)}$$

In another embodiment, the weight $q_i$ is based on a combination of one or more factors, where the standard deviations σ of the factors are combined in the calculation of the weight $q_i$. For example, each measurement may comprise multiple sources of uncertainty, such as variance in the TOF, AOA or PDOA measurements, variance in the position of the UE 105, time delay, etc. These effects can be combined to calculate a weight $q_i$ as follows:

$$q_i = \frac{1}{\sigma_r^2 + \sigma_v^2} \exp\left(-\frac{t_N - t_i}{\tau}\right) \qquad \text{(Eq. 19)}$$

In one example, the weights $q_i$ are precalculated and used as inputs during performance of the method 500 or 1200. In another example, operational parameter values, such as radio type, frequency, etc., are used as inputs for the method 500 or 1200, and the weights $q_i$ are calculated (e.g., by the processor(s) 210) by during performance of the method 500 or 1200.

In one example embodiment, in calculating the position of the target object 102 (block 530 of FIG. 5; block 1230 of FIG. 12), the reference position may be updated, such as to a more recent UE position. Updating the reference position to a more recent UE position may result in a more accurate determination of the location of the target object 102. For example, after calculating a first position of the target object 102 in a first iteration of blocks 520 and 530 of method 500, or in a first iteration of blocks 1220 and 1230 of method 1200, the one or more processors 210 may calculate a second position of the target object 102 in a second iteration of blocks 520 and 530 of method 500, or in a second iteration of blocks 1220 and 1230 of method 1200. In the second iteration, the one or more processors 210 may update the reference position to a more recent UE position (e.g., a position that the UE 105 travels to after the calculation of the first position) and use the more recent UE position to calculate the second position of the target object 102, as described with reference to FIG. 20.

FIG. 20 shows a flow diagram of a method 2000 for updating of the reference position in the calculation of a position of the target object 102. The method 2000 includes determining an updated reference position of the UE 105 (block 2010). The one or more processors 210, in combination with the one or more memories 211, may comprise means for determining the updated reference position of the UE 105. The method 2000 includes updating one or more positions of the UE 105 in the plurality of position-orientation-distance-angle values, or in the plurality of position-orientation-distance-phase values, to be relative to the updated reference position (block 2020). The one or more processors 210, in combination with the one or more memories 211, may comprise means for updating the one or more positions of the UE 105 in the plurality of position-orientation-distance-angle values, or in the plurality of position-orientation-distance-phase values, to be relative to the updated reference position. The method 2000 includes calculating the position of the target object 102 using the plurality of position-orientation-distance-angle values, or the plurality of position-orientation-distance-phase values, comprising the one or more updated positions, where the position of the target object 102 is relative to the updated reference position (block 2030). The one or more processors 210, in combination with the one or more memories 211, may comprise means for calculating the position of the target object 102 using the plurality of position-orientation-distance-angle values, or the plurality of position-orientation-distance-phase values, comprising the one or more updated positions, where the position of the target object 102 is relative to the updated reference position.

The position of the UE 105 may be updated at a variety of times. The current position of the UE 105 may be $\vec{p}_N$, the position at the time that the position of the target object 102 is output. The method 2000 includes updating the reference position to the current position $\vec{p}_N$ of the UE 105 and recalculating the one or more of the positions $\vec{p}_i$ to be relative to the updated reference position $\vec{p}_N$. The position $\vec{x}$ of the target object 102 may be calculated according to the method 500 or method 1200 using the samples $s_i$ that includes the updated $\vec{p}_i$, where the position $\vec{x}$ of the target object 102 is relative to $\vec{p}_N$.

Figure 21:
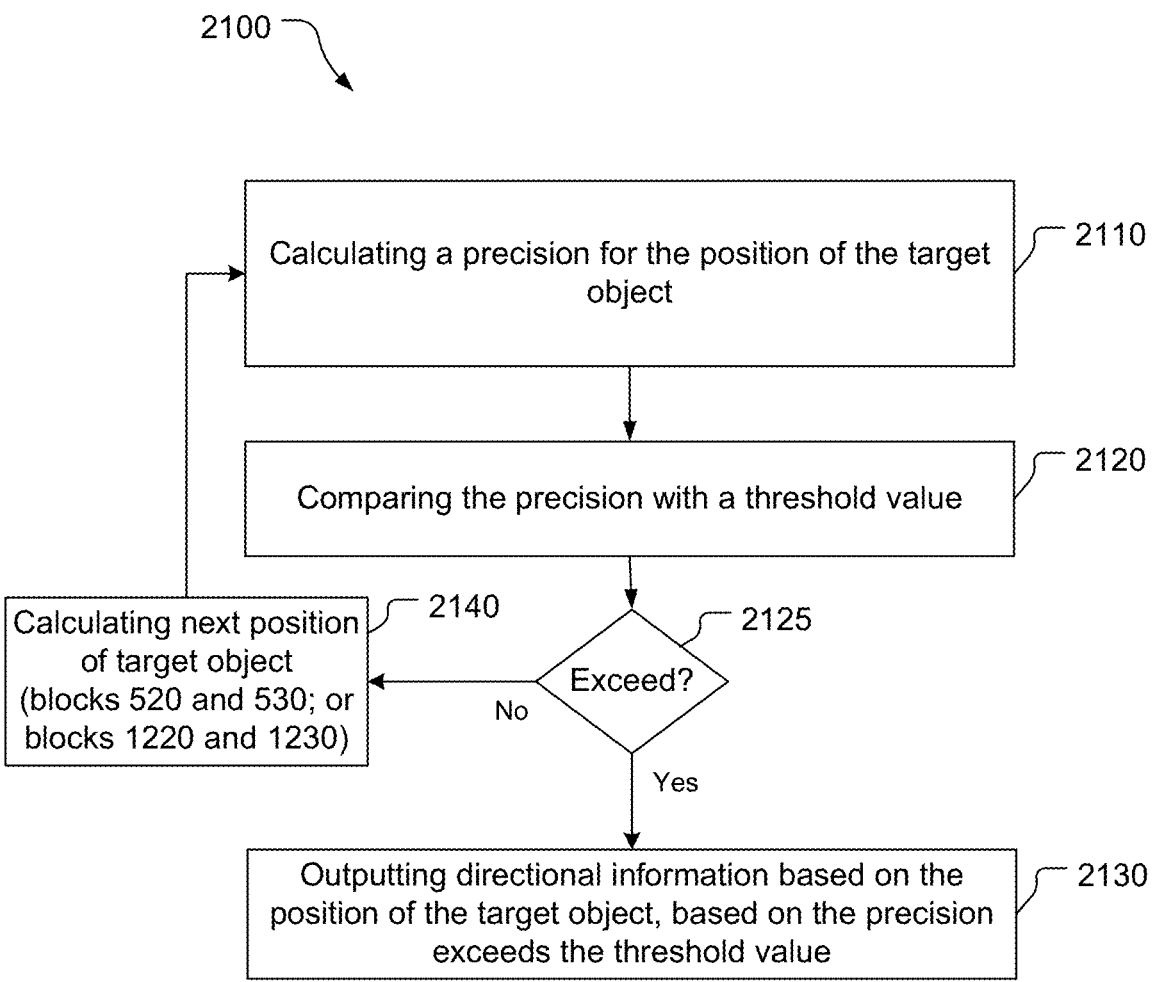
FIG. 21 shows a flow diagram of a method for selectively providing directional information to a user.

In an example embodiment, the method 500 or the method 1200 includes determining whether the estimated position of the target object 102 is sufficiently reliable to provide the directional information to the user. As described above with reference to FIGS. 7 and 14, the positions and the distances in the position-distance-angle values or the position-distance-phase values may not be exact. As more position-distance-angle values or position-distance-phase values are determined, the position of the target object 102 may become more precise. For example, each distance r may have a known standard deviation σ. FIG. 21 shows a flow diagram for a method 2100 for selectively providing directional information to the user. The method 2100 may include calculating a precision for the position of the target object 102 (block 2110). The one or more processors 210, in combination with the one or more memories 211, may comprise means for calculating the precision for the position of the target object 102. An example of the calculation of the precision is described further below. The method 2100 may include comparing the precision with a threshold value (block 2120). The threshold value represents a desired precision of the position of the target object 102. The one or more processors 210, in combination with the one or more memories 211, may comprise means for comparing the precision with the threshold value. If the precision exceeds (block 2125) the threshold value, then the method 2100 may include outputting directional information based on the position of the target object 102 (block 2130) (e.g., images 930, 940). The one or more processors 210, in combination with the one or more memories 211, may comprise means for outputting the directional information based on the position of the target object 102. For example, the directional information may be sent from the UE 105 to another entity (e.g., a server), may be transferred from one portion of the UE 105 to another portion of the UE 105, and/or provided to the user interface 216 and output from there to a user as one or more visual prompts and/or one or more audible prompts. If the threshold value is not exceeded, then blocks 520 and 530 (FIG. 5), or blocks 1220 and 1230 (FIG. 12), are repeated (block 2140) to calculate a next position of the target object 102 at least until the threshold value is exceeded or another condition is met, e.g., a number of position-orientation-distance-angle values or position-orientation-distance-phase values are determined or upon an expiration of a time period (block 2140). The one or more processors 210, in combination with the one or more memories 211, may comprise means for calculating the next position of the target object 102 at least until the threshold value is exceeded or another condition is met.

Figure 22:
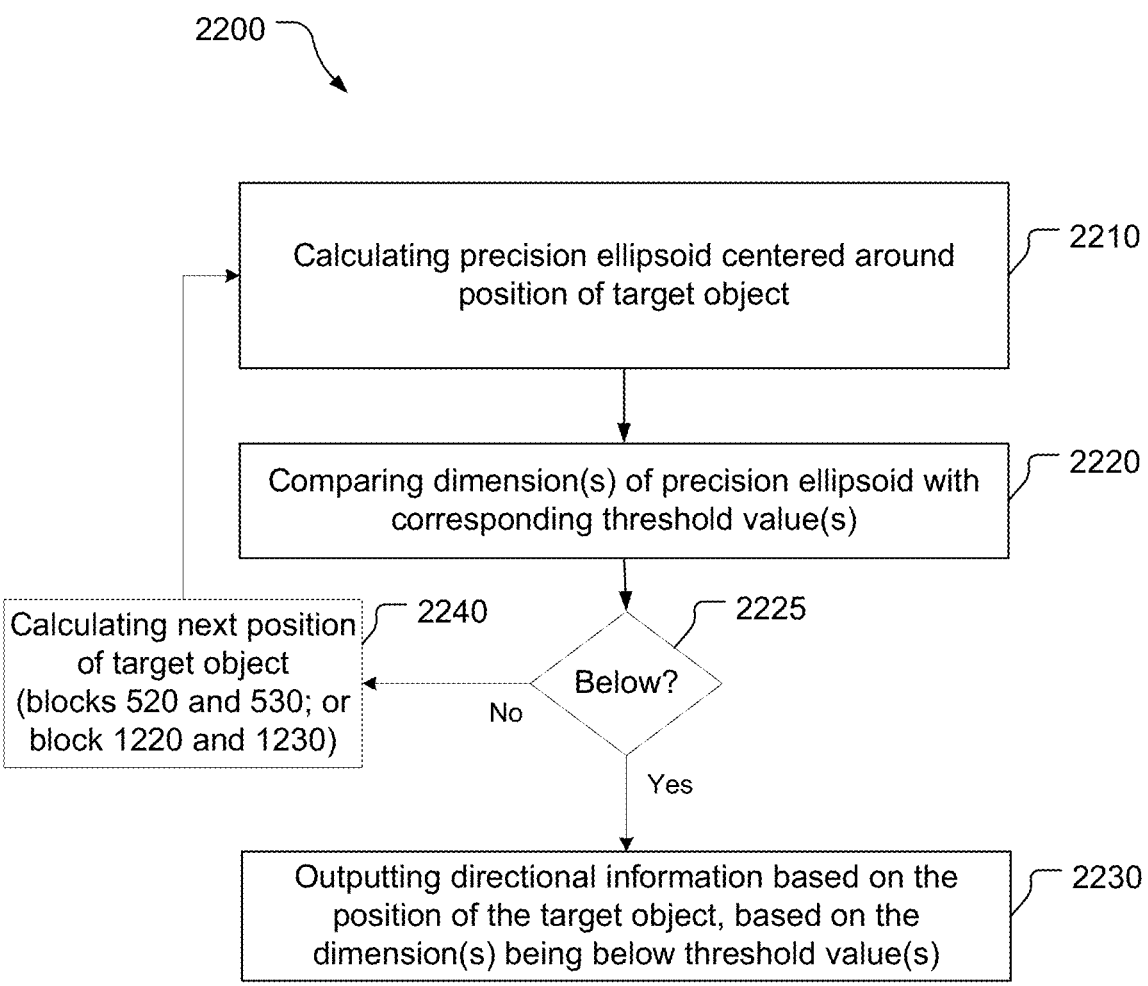
FIG. 22 illustrates a flow diagram of a method for calculating an absolute precision for a position of the target object.
Figure 23:
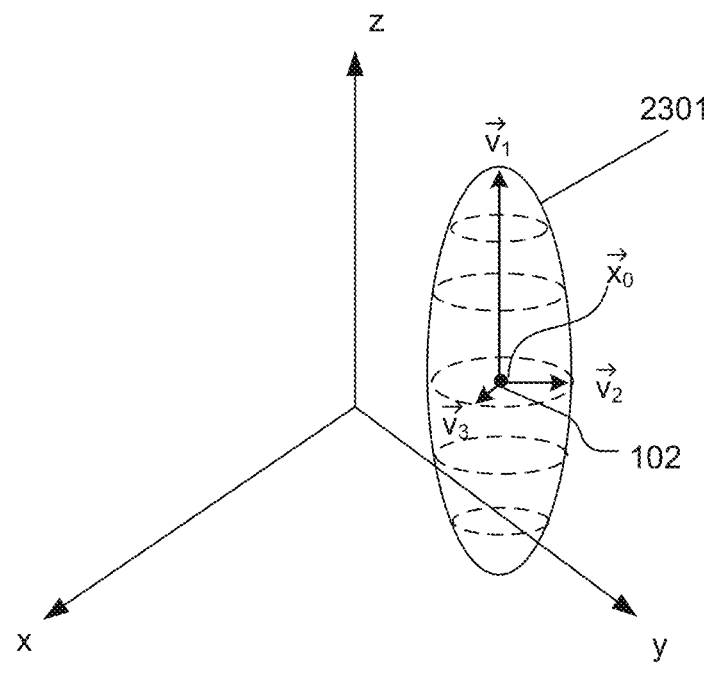
FIG. 23 illustrates an example precision ellipsoid centered around a position of the target object.

Two example measurements of precision for a determined position of the target object 102 include absolute precision and directional precision. As used herein, absolute precision refers to a precision determined for an individual coordinate of the position of the target object 102. Directional precision, as used herein, refers to a precision determined for a directional angle from the UE 105 to the target object 102. FIG. 22 shows a flow diagram of a method 2200 for calculating an absolute precision for a position of the target object 102. The method 2200 may include calculating a precision ellipsoid centered around a position of the target object 102 (block 2110), with the position of the target object 102 calculated as described above with reference to blocks 520 and 530 of FIG. 4, or blocks 1220 and 1230 of FIG. 12. The one or more processors 210, in combination with the one or more memories 211, may comprise means for calculating the precision ellipsoid centered around the position of the target object 102. FIG. 23 illustrates an example precision ellipsoid 2301 centered around a position $\vec{x}$ of the target object 102. A dimension of the precision ellipsoid in each direction indicates the confidence for the position $\vec{x}$ in each respective direction. The smaller the precision ellipsoid, the higher the confidence of the position $\vec{x}$.

Returning to FIG. 22, the method 2200 may include comparing the dimensions of the precision ellipsoid in one or more directions with one or more corresponding threshold values (block 2220). For example, the threshold values may be configured to be 1 meter along the x-axis, 4 meters along the y-axis, and 10 meters along the z-axis. The one or more processors 210, in combination with the one or more memories 211, may comprise means for comparing the dimensions of the precision ellipsoid in the one or more directions with the one or more corresponding threshold values. If the dimension(s) of the precision ellipsoid in the direction(s) is (are) below the corresponding threshold value(s) (as determined at block 2225), then directional information based on the position of the target object 102 may be output (block 2230). The one or more processors 210, in combination with the one or more memories 211, may comprise means for outputting the directional information based on the position of the target object 102 if the dimension(s) of the precision ellipsoid in the direction(s) is (are) below the corresponding threshold value(s). If the dimension(s) of the precision ellipsoid in the direction(s) is (are) not below the corresponding threshold value(s), then the calculation of the next position of the target object 102 (as described above with reference to blocks 520 and 530 of FIG. 5 or blocks 1220 and 1230 of FIG. 12), the calculation of the precision of the next position, and the comparison of dimension(s) of the precision ellipsoid (as described with reference to blocks 2210 and 2220) are repeated (block 2240). The one or more processors 210, in combination with the one or more memories 211, may comprise means for repeating the calculation of the precision of the next position, and comparing the dimension(s) of the precision ellipsoid.

Referring again to FIG. 23, illustrated is an example precision ellipsoid 2301 with the loss function $\Lambda(\vec{x})$ operating in three dimensions, i.e., a three-dimensional loss function $\Lambda(\vec{x})$. Plotting of the three-dimensional loss function $\Lambda(\vec{x})$ centered around the target position would require drawing in four dimensions. Instead of attempting to represent the precision with a four-dimensional plot, a three-dimensional plot of a precision ellipsoid 2301 centered around the position $\vec{x}$ of the target object 102 is used instead to represent the precision of the position $\vec{x}$. The shape of the precision ellipsoid 2301 may be given by eigenvectors/eigenvalues of a Hessian $\mathcal{H}_\Lambda$ of the three-dimensional loss function $\nabla^2 \Lambda(\vec{x})$:

$$\mathcal{H}_\Lambda = \nabla^2 \Lambda(\vec{x}) = \begin{pmatrix} \Lambda_{xx} & \Lambda_{xy} & \Lambda_{xz} \\ \Lambda_{yx} & \Lambda_{yy} & \Lambda_{yz} \\ \Lambda_{zx} & \Lambda_{zy} & \Lambda_{zz} \end{pmatrix} = \begin{pmatrix} \dfrac{\partial^2 \Lambda}{\Lambda x^2} & \dfrac{\partial^2 \Lambda}{\partial x \partial y} & \dfrac{\partial^2 \Lambda}{\partial x \partial z} \\ \dfrac{\partial^2 \Lambda}{\partial y \partial x} & \dfrac{\partial^2 \Lambda}{\partial y^3} & \dfrac{\partial^2 \Lambda}{\partial y \partial z} \\ \dfrac{\partial^2 \Lambda}{\partial z \partial x} & \dfrac{\partial^2 \Lambda}{\partial z \partial y} & \dfrac{\partial^2 \Lambda}{\partial z^2} \end{pmatrix} \quad \text{(Eq. 20)}$$

In this example, the Hessian $\mathcal{H}_\Lambda$ has three perpendicular, normalized eigenvectors $\vec{v_1}$, $\vec{v_2}$, and $\vec{v_3}$, with eigenvalues $\alpha_1$, $\alpha_2$, and $\alpha_3$, respectively. The semiaxes of the precision ellipsoid 1201 are given by the directions of the eigenvectors $\vec{v_1}$, $\vec{v_2}$, and $\vec{v_3}$. The behavior of the loss function $\Lambda(\vec{x})$ in the vicinity of the position $\vec{x}$ of the target object 102 may be estimated using the Hessian $\mathcal{H}_\Lambda$. The Taylor expansion for the loss function $\Lambda(\vec{x})$ near any point $\vec{x_0}$ is given by:

$$\Lambda(\vec{x}) \approx \Lambda(\vec{x_0}) + \nabla\Lambda(\vec{x_0})(\vec{x} - \vec{x_0}) + \frac{1}{2}(\vec{x} - \vec{x_0})^T \nabla^2 \Lambda(\vec{x})(\vec{x} - \vec{x_0}) \quad \text{(Eq. 21)}$$

At the position $\vec{x}$ of the target object 102 at which the loss function $\lambda(\vec{x})$ is a minimum, the gradient of the three-dimensional loss function $\nabla\Lambda(\vec{x})=0$, and the behavior of the loss function $\Lambda(\vec{x})$ around the position $\vec{x}$ is given by:

$$\Lambda(\vec{x}) \approx \Lambda(\vec{x_0}) + \frac{1}{2}(\vec{x} - \vec{x_0})^T \nabla^2 \Lambda(\vec{x})(\vec{x} - \vec{x_0}) \quad \text{(Eq. 22)}$$

The behavior of the loss function $\Lambda(\vec{x})$ around the position $\vec{x_0}$ can be understood by analyzing the Hessian $\mathcal{H}_\Lambda$. As a result of the analysis, the precision $\sigma_1$ in the direction of the eigenvector $\vec{v_1}$ can be given by:

$$\sigma_1 = \frac{1}{\sqrt{\alpha_1}} \quad \text{(Eq. 23)}$$

Similarly, the precisions $\sigma_2$ and $\sigma_3$ in the directions of the eigenvectors $\vec{v_2}$, and $\vec{v_3}$, respectively may be given by:

$$\sigma_2 = \frac{1}{\sqrt{\alpha_2}} \quad \text{(Eq. 24)}$$

and $$\sigma_3 = \frac{1}{\sqrt{\alpha_3}} \quad \text{(Eq. 25)}$$

Figure 24:
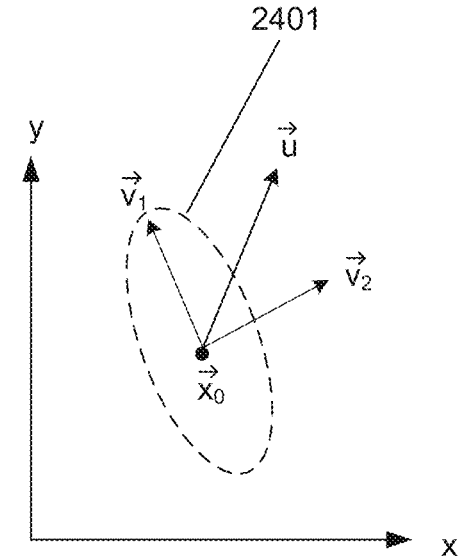
FIG. 24 illustrates the example precision ellipsoid of FIG. 23 in an arbitrary direction for a position of the target object.

Geometrically, the precision ellipsoid 2301 centered around the position $\vec{x_0}$ may be characterized as having semiaxes given by $\sigma_1$, $\sigma_2$, and $\sigma_3$. The directions with larger values of $\sigma$ have a lower precision (i.e., the ellipsoid is "wider") than directions with smaller values of $\sigma$ (i.e., the ellipsoid is "narrower"). In an example embodiment, the directional information output per block 2230 may include a graphical representation of the precision ellipsoid. Referring to FIG. 24, the precision $\sigma_{\vec{u}}$ for the position $\vec{x_0}$ (represented by the precision ellipse 2301) in an arbitrary direction $\vec{u}$ may be determined using:

$$\Lambda(\vec{x_0} + \epsilon \cdot u) \approx \Lambda(\vec{x_0}) + \frac{1}{2}\epsilon^2 \cdot \vec{u}^T \cdot \mathcal{H}_\Lambda \cdot \vec{u} = \Lambda(\vec{x_0}) + \frac{1}{2}\left(\frac{\epsilon}{\sigma_{\vec{u}}}\right)^2 \text{ where} \quad \text{(Eq. 26)}$$

$$\sigma_{\vec{u}} = \frac{1}{\sqrt{\vec{u}^T \cdot \mathcal{H}_\Lambda \cdot \vec{u}}}$$

Figure 25:
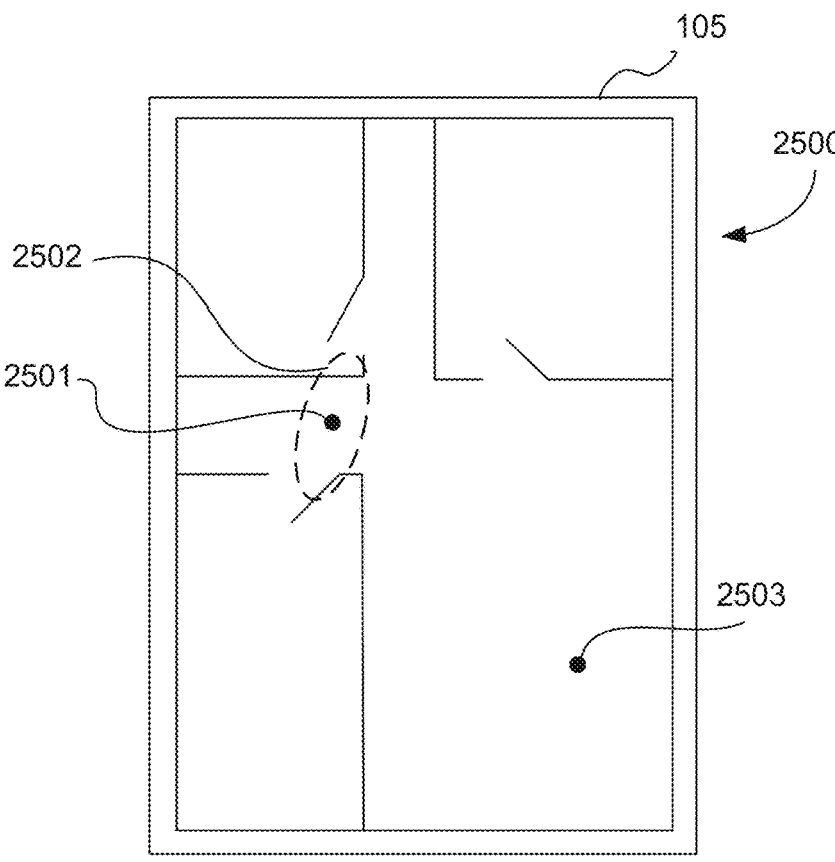
FIG. 25 illustrates an example display of a position of the target object with a representation of a precision ellipsoid or precision ellipse.

As illustrated in FIG. 25, an application execution on the UE 105 may display a map 2500 with an indication 2501 of the calculated position of the target object 102 and a representation 2502 of the precision ellipsoid 2301 or precision ellipse 2401. Optionally, an indication 2503 of the location of the UE 105 may also be displayed.

Figure 26:
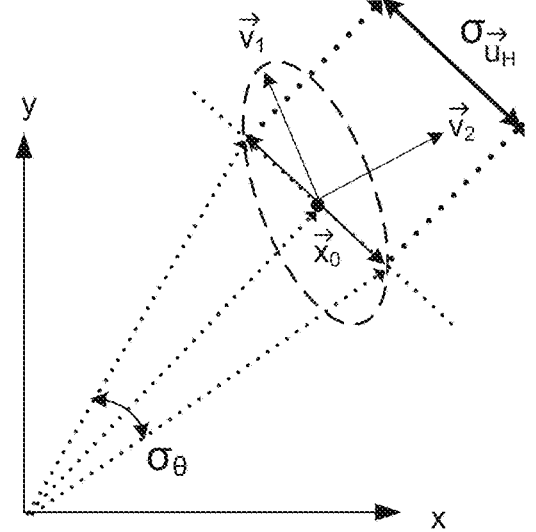
FIG. 26 illustrates an example angular precision for a position of the target object.
Figure 27:
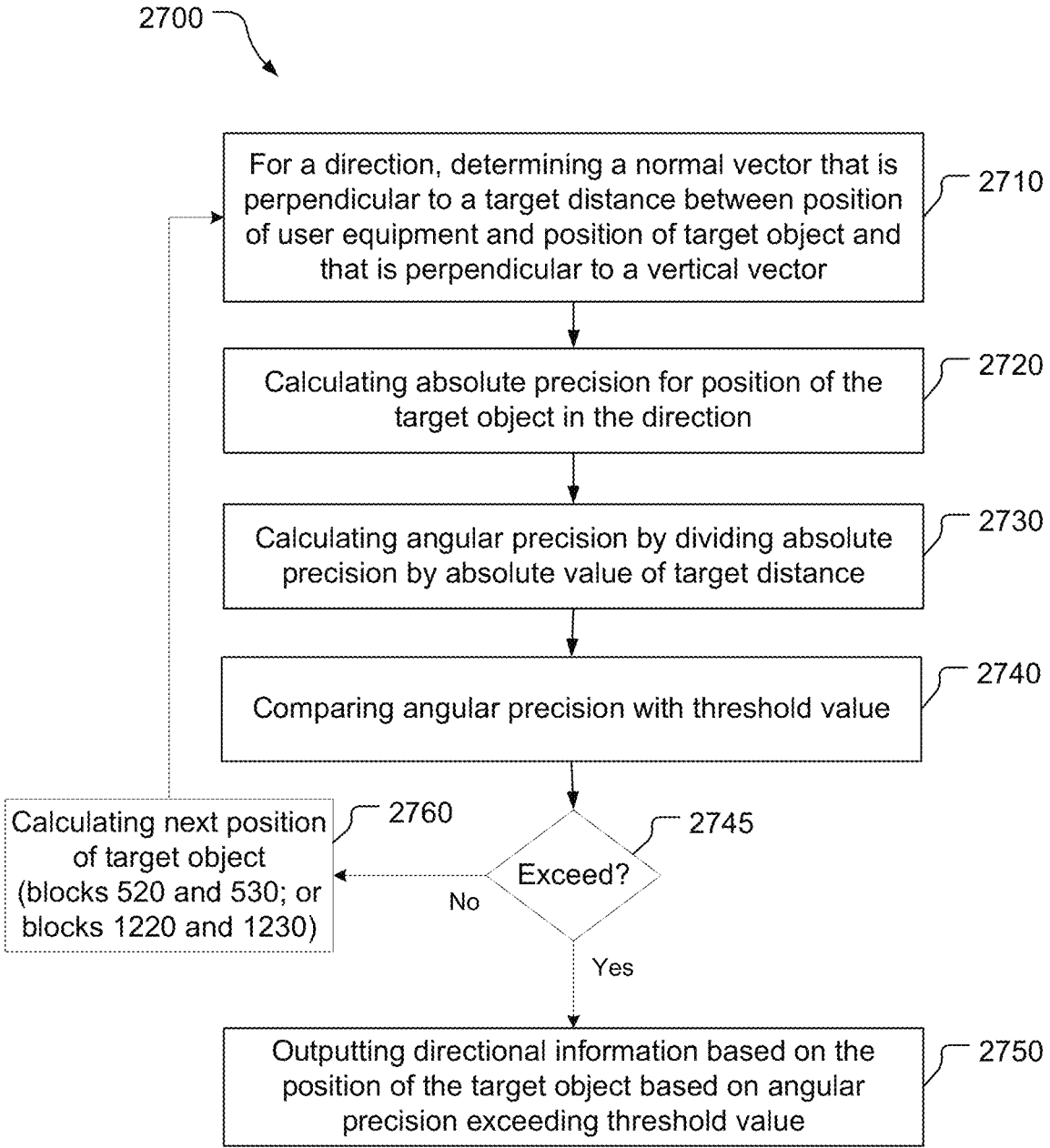
FIG. 27 shows a flow diagram of a method for calculating an angular precision for a position of the target object.

Referring to FIG. 26, a direction or angular precision in an arbitrary direction $\vec{u}$, e.g., horizontal direction $\vec{u_H}$ in the XY-plane, may be determined using an absolute precision $\sigma_{\overline{u_H}}$ in the direction $\vec{u}$. FIG. 27 shows a flow diagram of a method 2700 for calculating an angular precision for a position of the target object 102. To calculate the angular precision in an arbitrary direction, the method 2700 may include determining a normal vector $\vec{u_H}$ that is perpendicular to a target vector $(\vec{x_0} - \vec{p_N})$ between a position $(\vec{p_N}, \vec{a_N})$ of the UE 105 and a position $\vec{x_0}$ of the target object 102 and that is perpendicular to a unit vector in a vertical direction $[0,0,1]$ (block 2710). The one or more processors 210, in combination with the one or more memories 211, may comprise means for determining the normal vector. The method 2700 may include determining an absolute precision in the direction $\vec{u_H}$ (block 2720), as described above, and calculating the angular precision $\sigma_\theta$ by dividing the absolute precision $\sigma_{\overline{u_H}}$ by an absolute value of the target vector $\|\vec{x_0} - \vec{p_N}\|$ (block 2730). The one or more processors 210, in combination with the one or more memories 211, may comprise means for calculating the absolute precision and the angular precision. An example equation for the angular precision $\sigma_\theta$ is as follows:

$$\sigma_\theta = \frac{\sigma_{\vec{u}H}}{\|(\vec{x_0} - \vec{p_N})\|} \quad \text{(Eq. 27)}$$

The method 2700 may include comparing the angular precision $\sigma_\theta$ with a threshold value (block 2740), e.g., $$\frac{\pi}{3} = 60°.$$

The one or more processors 210, in combination with the one or more memories 211, may comprise means for comparing the angular precision with the threshold value. If the angular precision $\sigma_\theta$ exceeds the threshold value (e.g., 60°) (as determined at block 2745), then directional information based on the position $\vec{x_0}$ of the target object 102 may be output (block 2750). The one or more processors 210, in combination with the one or more memories 211, may comprise means for outputting the directional information. If the angular precision fails to exceed the threshold value (as determined at block 2745), then the calculation of the next position of the target object 102 (as described above with reference to blocks 520 and 530 of FIG. 5 or blocks 1220 and 1230 of FIG. 12) and the calculation of the position's angular precision and the comparison of with the threshold value (as described with reference to blocks 2710-2740) may be repeated (block 2760).

Implementation Examples

Clause 1. A user equipment, comprising: a first antenna and a second antenna; one or more memories; and one or more processors communicatively coupled to the one or more memories, the one or more processors being configured to: determine a plurality of position-orientation-distance-angle values, each of the plurality of position-orientation distance-angle values comprising: a position of the user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at the first antenna and the second antenna of the user equipment, wherein a combination of the position and the orientation of the user equipment in each of the plurality of position-orientation-distance-angle values is different; and calculate a position of the target object using the plurality of position-orientation-distance-angle values, wherein the position of the target object is relative to the reference position.

Clause 2. The user equipment of clause 1, wherein the one or more processors are configured to determine the orientation of the user equipment as an orientation of an antenna vector between the first antenna and the second antenna of the user equipment.

Clause 3. The user equipment of clause 1, wherein the user equipment does not employ a third antenna for determining the angle of arrival of the one or more wireless ranging signals.

Clause 4. The user equipment of clause 1, wherein the one or more processors are configured to calculate the angle based on a phase delay of a signal received by the first antenna and the second antenna of the user equipment.

Clause 5. The user equipment of clause 1, wherein to calculate the position of the target object, the one or more processors are configured to: determine an updated reference position; update one or more positions of the user equipment in the plurality of position-orientation-distance-angle values to be relative to the updated reference position; and calculate the position of the target object using the plurality of position-orientation-distance-angle values, wherein the position of the target object is relative to the updated reference position.

Clause 6. The user equipment of clause 1, wherein to calculate the position of the target object, the one or more processors are configured to: use the plurality of position-orientation-distance-angle values to build a loss function; and determine the position of the target object by minimizing the loss function.

Clause 7. The user equipment of clause 1, wherein the one or more processors are further configured to: calculate a precision for the position of the target object; compare the precision with a threshold value; and output directional information based on the position of the target object based on the precision exceeding the threshold value.

Clause 8. The user equipment of clause 7, wherein to calculate of the precision, the one or more processors are configured to: calculate a precision ellipsoid centered around the position of the target object; compare one or more dimensions of the precision ellipsoid with one or more corresponding threshold values; and output the directional information based on the position of the target object based on the one or more dimensions being below the one or more corresponding threshold values.

Clause 9. The user equipment of clause 7, wherein to calculate the precision, the one or more processors are configured to: for a direction, determine a normal vector that is perpendicular to a target vector between the position of the user equipment and the position of the target object and that is perpendicular to a vertical vector; calculate an absolute precision for the position of the target object in the direction; calculate an angular precision by dividing the absolute precision by an absolute value of the target vector; compare the angular precision with the threshold value; and output the directional information based on the position of the target object based on the angular precision exceeding the threshold value.

Clause 10. A method for locating a target object, comprising: determining a plurality of position-orientation-distance-angle values, each of the plurality of position-orientation distance-angle values comprising: a position of a user equipment relative to a reference position; an orientation of the user equipment relative to a reference orientation corresponding to the reference position; a distance between the position of the user equipment and the target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, wherein a combination of the position and the orientation of the user equipment in each of the plurality of position-orientation-distance-angle values is different; and calculating a position of the target object using the plurality of position-orientation-distance-angle values, wherein the position of the target object is relative to the reference position.

Clause 11. The method of clause 10, comprising: determining the orientation of the user equipment as an orientation of an antenna vector between the first antenna and the second antenna of the user equipment.

Clause 12. The method of clause 10, comprising: determining the angle of arrival of the one or more wireless ranging signals without employing a third antenna.

Clause 13. The method of clause 10, comprising: calculating the angle based on a phase delay of a signal received by the first antenna and the second antenna of the user equipment.

Clause 14. The method of clause 10, wherein the calculating of the position of the target object, comprises: determining an updated reference position; updating one or more positions of the user equipment in the plurality of position-orientation-distance-angle values to be relative to the updated reference position; and calculating the position of the target object using the plurality of position-orientation-distance-angle values, wherein the position of the target object is relative to the updated reference position.

Clause 15. The method of clause 10, wherein the calculating of the position of the target object, comprises: using the plurality of position-orientation-distance-angle values to build a loss function; and determining the position of the target object by minimizing the loss function.

Clause 16. The method of clause 10, further comprising: calculating a precision for the position of the target object; comparing the precision with a threshold value; and outputting directional information based on the position of the target object based on the precision exceeding the threshold value.

Clause 17. The method of clause 16, wherein the calculating of the precision, comprises: calculating a precision ellipsoid centered around the position of the target object; comparing one or more dimensions of the precision ellipsoid with one or more corresponding threshold values; and outputting the directional information based on the position of the target object based on the one or more dimensions being below the one or more corresponding threshold values.

Clause 18. The method of clause 16, wherein the calculating of the precision, comprises: for a direction, determining a normal vector that is perpendicular to a target vector between the position of the user equipment and the position of the target object and that is perpendicular to a vertical vector; calculating an absolute precision for the position of the target object in the direction; calculating an angular precision by dividing the absolute precision by an absolute value of the target vector; comparing the angular precision with the threshold value; and outputting the directional information based on the position of the target object based on the angular precision exceeding the threshold value.

Clause 19. A computing device, comprising: means for determining a plurality of position-orientation-distance-angle values, each of the plurality of position-orientation distance-angle values comprising: a position of a user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, wherein a combination of the position and the orientation of the user equipment in each of the plurality of position-orientation-distance-angle values is different; and means for calculating a position of the target object using the plurality of position-orientation-distance-angle values, wherein the position of the target object is relative to the reference position.

Clause 20. The device of clause 19, comprising: means for determining the orientation of the user equipment as an orientation of an antenna vector between the first antenna and the second antenna of the user equipment.

Clause 21. The device of clause 19, comprising: means for determining the angle of arrival of the one or more wireless ranging signals without employing a third antenna.

Clause 22. The device of clause 19, comprising: means for calculating the angle based on a phase delay of a signal received by the first antenna and the second antenna of the user equipment.

Clause 23. The device of clause 19, wherein the means for calculating the position of the target object, comprises: means for determining an updated reference position; means for updating one or more positions of the user equipment in the plurality of position-orientation-distance-angle values to be relative to the updated reference position; and means for calculating the position of the target object using the plurality of position-orientation-distance-angle values, wherein the position of the target object is relative to the updated reference position.

Clause 24. The device of clause 19, wherein the means for calculating the position of the target object, comprises: means for using the plurality of position-orientation-distance-angle values to build a loss function; and means for determining the position of the target object by minimizing the loss function.

Clause 25. The device of clause 19, further comprising: means for calculating a precision for the position of the target object; means for comparing the precision with a threshold value; and means for outputting directional information based on the position of the target object based on the precision exceeding the threshold value.

Clause 26. The device of clause 25, wherein the means for calculating the precision, comprises: means for calculating a precision ellipsoid centered around the position of the target object; means for comparing one or more dimensions of the precision ellipsoid with one or more corresponding threshold values; and means for outputting the directional information based on the position of the target object based on the one or more dimensions being below the one or more corresponding threshold values.

Clause 27. The device of clause 25, wherein the means for calculating the precision, comprises: means for, for a direction, determining a normal vector that is perpendicular to a target vector between the position of the user equipment and the position of the target object and that is perpendicular to a vertical vector; means for calculating an absolute precision for the position of the target object in the direction; means for calculating an angular precision by dividing the absolute precision by an absolute value of the target vector; means for comparing the angular precision with the threshold value; and means for outputting the directional information based on the position of the target object based on the angular precision exceeding the threshold value.

Clause 28. A non-transitory, processor-readable storage medium comprising processor-readable instructions to cause one or more processors to: determine a plurality of position-orientation-distance-angle values, each of the plurality of position-orientation distance-angle values comprising: a position of a user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, wherein a combination of the position and the orientation of the user equipment in each of the plurality of position-orientation-distance-angle values is different; and calculate a position of the target object using the plurality of position-orientation-distance-angle values, wherein the position of the target object is relative to the reference position.

Clause 29. The medium of clause 28, wherein the one or more processors are configured to determine the orientation of the user equipment as an orientation of an antenna vector between the first antenna and the second antenna of the user equipment.

Clause 30. The medium of clause 28, wherein the user equipment does not employ a third antenna for determining the angle of arrival of the one or more wireless ranging signals.

Clause 31. The medium of clause 28, wherein the one or more processors are configured to calculate the angle based on a phase delay of a signal received by the first antenna and the second antenna of the user equipment.

Clause 32. The medium of clause 28, wherein to calculate the position of the target object, the one or more processors are configured to: determine an updated reference position; update one or more positions of the user equipment in the plurality of position-orientation-distance-angle values to be relative to the updated reference position; and calculate the position of the target object using the plurality of position-orientation-distance-angle values, wherein the position of the target object is relative to the updated reference position.

Clause 33. The medium of clause 28, wherein to calculate the position of the target object, the one or more processors are configured to: use the plurality of position-orientation-distance-angle values to build a loss function; and determine the position of the target object by minimizing the loss function.

Clause 34. The medium of clause 28, wherein the one or more processors are further configured to: calculate a precision for the position of the target object; compare the precision with a threshold value; and output directional information based on the position of the target object based on the precision exceeding the threshold value.

Clause 35. The medium of clause 34, wherein to calculate of the precision, the one or more processors are configured to: calculate a precision ellipsoid centered around the position of the target object; compare one or more dimensions of the precision ellipsoid with one or more corresponding threshold values; and output the directional information based on the position of the target object based on the one or more dimensions being below the one or more corresponding threshold values.

Clause 36. The medium of clause 34, wherein to calculate the precision, the one or more processors are configured to: for a direction, determine a normal vector that is perpendicular to a target vector between the position of the user equipment and the position of the target object and that is perpendicular to a vertical vector; calculate an absolute precision for the position of the target object in the direction; calculate an angular precision by dividing the absolute precision by an absolute value of the target vector; compare the angular precision with the threshold value; and output the directional information based on the position of the target object based on the angular precision exceeding the threshold value.

Clause 37. A user equipment, comprising: a first antenna and a second antenna; one or more memories; and one or more processors communicatively coupled to the one or more memories, the one or more processors being configured to: determine a plurality of position-orientation-distance-phase values, each of the plurality of position-orientation-distance-phase values comprising: a position of the user equipment relative to a reference position; an orientation of the user equipment relative to a reference orientation corresponding to the reference position; a distance corresponding to the position of the user equipment, the distance being between the position of the user equipment and a target object based on one or more wireless ranging signals between the user equipment and the target object; and a phase corresponding to the position and the orientation of the user equipment, the phase being a phase delay of arrival of the one or more wireless ranging signals between the first antenna and the second antenna, wherein a combination of the position and the orientation of the user equipment in each of the plurality of position-orientation-distance-phase values is different; and calculate a position of the target object using the plurality of position-orientation-distance-phase values, wherein the position of the target object is relative to the reference position.

Clause 38. The user equipment of clause 37, wherein to calculate the position of the target object, the one or more processors are configured to: use the plurality of position-orientation-distance-phase values to build a loss function; and determine the position of the target object by minimizing the loss function.

Clause 39. The user equipment of clause 38, wherein a separation L between the first antenna and the second antenna is greater than λ/2, wherein A comprises a wavelength of the one or more wireless ranging signals.

Clause 40. The user equipment of clause 39, wherein to minimize the loss function, the one or more processors are configured to: perform iterations of a combination of a gradient descent and a genetic cross-over until a stop condition occurs.

Clause 41. The user equipment of clause 40, wherein to perform the iterations of the combination of the gradient descent and the genetic cross-over, the one or more processors are configured to: generate a pool of candidate positions comprising a plurality of random candidate positions of the target object; execute a gradient descent of the loss function on each candidate position in the pool of candidate positions; select a top number of candidate positions, from the pool of candidate positions, with lowest values of the loss function; create one or more new children candidate positions using a genetic cross-over of the top number of candidate positions; create a new pool of candidate positions to comprise the top number of candidate positions and the one or more new children candidate positions; fill a remainder of the new pool of candidate positions with one or more new random candidate positions; and perform the gradient descent of the loss function on each candidate position in the new pool of candidate positions.

Clause 42. A method for locating a target object, comprising: determining a plurality of position-orientation-distance-phase values, each of the plurality of position-orientation-distance-phase values comprising: a position of a user equipment relative to a reference position; an orientation of the user equipment relative to a reference orientation corresponding to the reference position; a distance corresponding to the position of the user equipment, the distance being between the position of the user equipment and the target object based on one or more wireless ranging signals between the user equipment and the target object; and a phase corresponding to the position and the orientation of the user equipment, the phase being a phase delay of arrival of the one or more wireless ranging signals between a first antenna and a second antenna of the user equipment, wherein a combination of the position and the orientation of the user equipment in each of the plurality of position-orientation-distance-phase values is different; and calculating a position of the target object using the plurality of position-orientation-distance-phase values, wherein the position of the target object is relative to the reference position.

Clause 43. The method of clause 42, wherein the calculating of the position of the target object, comprises: using the plurality of position-orientation-distance-phase values to build a loss function; and determining the position of the target object by minimizing the loss function.

Clause 44. The method of clause 43, wherein a separation L between the first antenna and the second antenna is greater than λ/2, wherein A comprises a wavelength of the one or more wireless ranging signals.

Clause 45. The method of clause 44, comprising: to minimize the loss function, performing iterations of a combination of a gradient descent and a genetic cross-over until a stop condition occurs.

Clause 46. The method of clause 45, wherein the performing of the iterations of the combination of the gradient descent and the genetic cross-over, comprises: generating a pool of candidate positions comprising a plurality of random candidate positions of the target object; executing a gradient descent of the loss function on each candidate position in the pool of candidate positions; selecting a top number of candidate positions, from the pool of candidate positions, with lowest values of the loss function; creating one or more new children candidate positions using a genetic cross-over of the top number of candidate positions; creating a new pool of candidate positions to comprise the top number of candidate positions and the one or more new children candidate positions; filling a remainder of the new pool of candidate positions with one or more new random candidate positions; and performing the gradient descent of the loss function on each candidate position in the new pool of candidate positions.

Clause 47. A computing device, comprising: means for determining a plurality of position-orientation-distance-phase values, each of the plurality of position-orientation-distance-phase values comprising: a position of a user equipment relative to a reference position; an orientation of the user equipment relative to a reference orientation corresponding to the reference position; a distance corresponding to the position of the user equipment, the distance being between the position of the user equipment and a target object based on one or more wireless ranging signals between the user equipment and the target object; and a phase corresponding to the position and the orientation of the user equipment, the phase being a phase delay of arrival of the one or more wireless ranging signals between a first antenna and a second antenna of the user equipment, wherein a combination of the position and the orientation of the user equipment in each of the plurality of position-orientation-distance-phase values is different; and calculating a position of the target object using the plurality of position-orientation-distance-phase values, wherein the position of the target object is relative to the reference position.

Clause 48. The device of clause 47, wherein the means for calculating the position of the target object, comprises: means for using the plurality of position-orientation-distance-phase values to build a loss function; and means for determining the position of the target object by minimizing the loss function.

Clause 49. The device of clause 48, wherein a separation L between the first antenna and the second antenna is greater than $\lambda/2$, wherein A comprises a wavelength of the one or more wireless ranging signals.

Clause 50. The device of clause 49, comprising: means for, to minimize the loss function, performing iterations of a combination of a gradient descent and a genetic cross-over until a stop condition occurs.

Clause 51. The device of clause 50, wherein the means for performing the iterations of the combination of the gradient descent and the genetic cross-over, comprises: means for generating a pool of candidate positions comprising a plurality of random candidate positions of the target object; means for executing a gradient descent of the loss function on each candidate position in the pool of candidate positions; means for selecting a top number of candidate positions, from the pool of candidate positions, with lowest values of the loss function; means for creating one or more new children candidate positions using a genetic cross-over of the top number of candidate positions; means for creating a new pool of candidate positions to comprise the top number of candidate positions and the one or more new children candidate positions; means for filling a remainder of the new pool of candidate positions with one or more new random candidate positions; and means for performing the gradient descent of the loss function on each candidate position in the new pool of candidate positions.

Clause 52. A non-transitory, processor-readable storage medium comprising processor-readable instructions to cause one or more processors to: determine a plurality of position-orientation-distance-phase values, each of the plurality of position-orientation-distance-phase values comprising: a position of a user equipment relative to a reference position; an orientation of the user equipment relative to a reference orientation corresponding to the reference position; a distance corresponding to the position of the user equipment, the distance being between the position of the user equipment and a target object based on one or more wireless ranging signals between the user equipment and the target object; and a phase corresponding to the position and the orientation of the user equipment, the phase being a phase delay of arrival of the one or more wireless ranging signals between a first antenna and a second antenna of the user equipment, wherein a combination of the position and the orientation of the user equipment in each of the plurality of position-orientation-distance-phase values is different; and calculate a position of the target object using the plurality of position-orientation-distance-phase values, wherein the position of the target object is relative to the reference position.

Clause 53. The medium of clause 52, wherein to calculate the position of the target object, the one or more processors are configured to: use the plurality of position-orientation-distance-phase values to build a loss function; and determine the position of the target object by minimizing the loss function.

Clause 54. The medium of clause 53, wherein a separation L between the first antenna and the second antenna is greater than $\lambda/2$, wherein A comprises a wavelength of the one or more wireless ranging signals.

Clause 55. The medium of clause 54, wherein to minimize the loss function, the one or more processors are configured to: perform iterations of a combination of a gradient descent and a genetic cross-over until a stop condition occurs.

Clause 56. The medium of clause 55, wherein to perform the iterations of the combination of the gradient descent and the genetic cross-over, the one or more processors are configured to: generate a pool of candidate positions comprising a plurality of random candidate positions of the target object; execute a gradient descent of the loss function on each candidate position in the pool of candidate positions; select a top number of candidate positions, from the pool of candidate positions, with lowest values of the loss function; create one or more new children candidate positions using a genetic cross-over of the top number of candidate positions; create a new pool of candidate positions to comprise the top number of candidate positions and the one or more new children candidate positions; fill a remainder of the new pool of candidate positions with one or more new random candidate positions; and perform the gradient descent of the loss function on each candidate position in the new pool of candidate positions.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment, comprising:
   a first antenna and a second antenna;
   one or more memories; and
   one or more processors communicatively coupled to the one or more memories, the one or more processors being configured to:
      determine a plurality of position-orientation-distance-angle values, each of the plurality of position-orientation distance-angle values comprising: a position of the user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at the first antenna and the second antenna of the user equipment, wherein a combination of the position and the orientation of the user equipment in each of the plurality of position-orientation-distance-angle values is different; and
      calculate a position of the target object using the plurality of position-orientation-distance-angle values, wherein the position of the target object is relative to the reference position.

2. The user equipment of claim 1, wherein the one or more processors are configured to determine the orientation of the user equipment as an orientation of an antenna vector between the first antenna and the second antenna of the user equipment.

3. The user equipment of claim 1, wherein the user equipment does not employ a third antenna for determining the angle of arrival of the one or more wireless ranging signals.

4. The user equipment of claim 1, wherein the one or more processors are configured to calculate the angle based on a phase delay of a signal received by the first antenna and the second antenna of the user equipment.

5. The user equipment of claim 1, wherein to calculate the position of the target object, the one or more processors are configured to:
   determine an updated reference position;
   update one or more positions of the user equipment in the plurality of position-orientation-distance-angle values to be relative to the updated reference position; and
   calculate the position of the target object using the plurality of position-orientation-distance-angle values, wherein the position of the target object is relative to the updated reference position.

6. The user equipment of claim 1, wherein to calculate the position of the target object, the one or more processors are configured to:
   use the plurality of position-orientation-distance-angle values to build a loss function; and
   determine the position of the target object by minimizing the loss function.

7. The user equipment of claim 1, wherein the one or more processors are further configured to:
   calculate a precision for the position of the target object;
   compare the precision with a threshold value; and
   output directional information based on the position of the target object based on the precision exceeding the threshold value.

8. The user equipment of claim 7, wherein to calculate of the precision, the one or more processors are configured to:
   calculate a precision ellipsoid centered around the position of the target object;
   compare one or more dimensions of the precision ellipsoid with one or more corresponding threshold values; and
   output the directional information based on the position of the target object based on the one or more dimensions being below the one or more corresponding threshold values.

9. The user equipment of claim 7, wherein to calculate the precision, the one or more processors are configured to:
   for a direction, determine a normal vector that is perpendicular to a target vector between the position of the user equipment and the position of the target object and that is perpendicular to a vertical vector;
   calculate an absolute precision for the position of the target object in the direction;
   calculate an angular precision by dividing the absolute precision by an absolute value of the target vector;
   compare the angular precision with the threshold value; and
   output the directional information based on the position of the target object based on the angular precision exceeding the threshold value.

10. A method for locating a target object, comprising:
   determining a plurality of position-orientation-distance-angle values, each of the plurality of position-orientation distance-angle values comprising: a position of a user equipment relative to a reference position; an orientation of the user equipment relative to a reference orientation corresponding to the reference position; a distance between the position of the user equipment and the target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, wherein a combination of the position and the orientation of the user equipment in each of the plurality of position-orientation-distance-angle values is different; and calculating a position of the target object using the plurality of position-orientation-distance-angle values, wherein the position of the target object is relative to the reference position.

11. The method of claim 10, comprising: determining the orientation of the user equipment as an orientation of an antenna vector between the first antenna and the second antenna of the user equipment.

12. The method of claim 10, comprising: determining the angle of arrival of the one or more wireless ranging signals without employing a third antenna.

13. The method of claim 10, comprising: calculating the angle based on a phase delay of a signal received by the first antenna and the second antenna of the user equipment.

14. The method of claim 10, wherein the calculating of the position of the target object, comprises:

determining an updated reference position;

updating one or more positions of the user equipment in the plurality of position-orientation-distance-angle values to be relative to the updated reference position; and calculating the position of the target object using the plurality of position-orientation-distance-angle values, wherein the position of the target object is relative to the updated reference position.

15. The method of claim 10, wherein the calculating of the position of the target object, comprises:

using the plurality of position-orientation-distance-angle values to build a loss function; and determining the position of the target object by minimizing the loss function.

16. The method of claim 10, further comprising:

calculating a precision for the position of the target object;

comparing the precision with a threshold value; and outputting directional information based on the position of the target object based on the precision exceeding the threshold value.

17. The method of claim 16, wherein the calculating of the precision, comprises:

calculating a precision ellipsoid centered around the position of the target object;

comparing one or more dimensions of the precision ellipsoid with one or more corresponding threshold values; and outputting the directional information based on the position of the target object based on the one or more dimensions being below the one or more corresponding threshold values.

18. The method of claim 16, wherein the calculating of the precision, comprises:

for a direction, determining a normal vector that is perpendicular to a target vector between the position of the user equipment and the position of the target object and that is perpendicular to a vertical vector;

calculating an absolute precision for the position of the target object in the direction;

calculating an angular precision by dividing the absolute precision by an absolute value of the target vector;

comparing the angular precision with the threshold value; and outputting the directional information based on the position of the target object based on the angular precision exceeding the threshold value.

19. A computing device, comprising:

means for determining a plurality of position-orientation-distance-angle values, each of the plurality of position-orientation distance-angle values comprising: a position of a user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, wherein a combination of the position and the orientation of the user equipment in each of the plurality of position-orientation-distance-angle values is different; and means for calculating a position of the target object using the plurality of position-orientation-distance-angle values, wherein the position of the target object is relative to the reference position.

20. The device of claim 19, comprising: means for determining the orientation of the user equipment as an orientation of an antenna vector between the first antenna and the second antenna of the user equipment.

21. The device of claim 19, comprising: means for determining the angle of arrival of the one or more wireless ranging signals without employing a third antenna.

22. The device of claim 19, comprising: means for calculating the angle based on a phase delay of a signal received by the first antenna and the second antenna of the user equipment.

23. The device of claim 19, wherein the means for calculating the position of the target object, comprises:

means for determining an updated reference position;

means for updating one or more positions of the user equipment in the plurality of position-orientation-distance-angle values to be relative to the updated reference position; and means for calculating the position of the target object using the plurality of position-orientation-distance-angle values, wherein the position of the target object is relative to the updated reference position.

24. The device of claim 19, wherein the means for calculating the position of the target object, comprises:

means for using the plurality of position-orientation-distance-angle values to build a loss function; and means for determining the position of the target object by minimizing the loss function.

25. The device of claim 19, further comprising:

means for calculating a precision for the position of the target object;

means for comparing the precision with a threshold value; and means for outputting directional information based on the position of the target object based on the precision exceeding the threshold value.

26. The device of claim 25, wherein the means for calculating the precision, comprises:

means for calculating a precision ellipsoid centered around the position of the target object;

means for comparing one or more dimensions of the precision ellipsoid with one or more corresponding threshold values; and means for outputting the directional information based on the position of the target object based on the one or more dimensions being below the one or more corresponding threshold values.

27. The device of claim 25, wherein the means for calculating the precision, comprises:

means for, for a direction, determining a normal vector that is perpendicular to a target vector between the position of the user equipment and the position of the target object and that is perpendicular to a vertical vector;

means for calculating an absolute precision for the position of the target object in the direction;

means for calculating an angular precision by dividing the absolute precision by an absolute value of the target vector;

means for comparing the angular precision with the threshold value; and means for outputting the directional information based on the position of the target object based on the angular precision exceeding the threshold value.

28. A non-transitory, processor-readable storage medium comprising processor-readable instructions to cause one or more processors to:

determine a plurality of position-orientation-distance-angle values, each of the plurality of position-orientation distance-angle values comprising: a position of a user equipment relative to a reference position; an orientation of the user equipment relative to a reference orientation corresponding to the reference position; a distance between the position of the user equipment and a target object based on one or more wireless ranging signals between the user equipment and the target object; and an angle of the target object corresponding to the position and the orientation of the user equipment, the angle being an angle of arrival of the one or more wireless ranging signals at a first antenna and a second antenna of the user equipment, wherein a combination of the position and the orientation of the user equipment in each of the plurality of position-orientation-distance-angle values is different; and calculate a position of the target object using the plurality of position-orientation-distance-angle values, wherein the position of the target object is relative to the reference position.

29. The medium of claim 28, wherein the one or more processors are configured to determine the orientation of the user equipment as an orientation of an antenna vector between the first antenna and the second antenna of the user equipment.

30. The medium of claim 28, wherein the user equipment does not employ a third antenna for determining the angle of arrival of the one or more wireless ranging signals.

* * * * *